(12) United States Patent  (10) Patent No.: US 8,166,542 B2
Uno  (45) Date of Patent: Apr. 24, 2012

(54) INFORMATION PROCESSING APPARATUS, USER INFORMATION MANAGING METHOD, AND COMPUTER PROGRAM PRODUCT

(75) Inventor: Takahiko Uno, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 978 days.

(21) Appl. No.: 11/896,725

(22) Filed: Sep. 5, 2007

(65) Prior Publication Data

US 2008/0060070 A1  Mar. 6, 2008

(30) Foreign Application Priority Data

Sep. 6, 2006  (JP) ................................ 2006-241888
Jul. 26, 2007  (JP) ................................ 2007-194657

(51) Int. Cl.
*G06F 21/00* (2006.01)
*G06F 12/14* (2006.01)
*G06F 3/12* (2006.01)

(52) U.S. Cl. ........ 726/21; 705/26.1; 358/1.14; 358/1.15

(58) Field of Classification Search ........................ None
See application file for complete search history.

(56) References Cited

U.S. PATENT DOCUMENTS

| | | | | |
|---|---|---|---|---|
| 6,880,091 | B1 * | 4/2005 | Mattis et al. ...................... | 726/5 |
| 7,755,792 | B2 * | 7/2010 | Sakayama et al. ............ | 358/1.15 |
| 2003/0167336 | A1 * | 9/2003 | Iwamoto et al. .............. | 709/229 |
| 2004/0021900 | A1 * | 2/2004 | Arakawa ....................... | 358/1.15 |
| 2004/0130743 | A1 * | 7/2004 | Nozato .......................... | 358/1.14 |
| 2004/0236705 | A1 * | 11/2004 | Shima et al. ................... | 705/400 |
| 2006/0026434 | A1 * | 2/2006 | Yoshida et al. ............... | 713/182 |
| 2006/0114501 | A1 * | 6/2006 | Nakamura .................... | 358/1.15 |
| 2006/0126100 | A1 * | 6/2006 | Jung ............................. | 358/1.14 |
| 2006/0221388 | A1 | 10/2006 | Yoshikawa et al. | |
| 2006/0248153 | A1 * | 11/2006 | Hejza Litwiller et al. ..... | 709/206 |
| 2006/0271781 | A1 * | 11/2006 | Murakawa .................... | 713/168 |
| 2007/0083752 | A1 * | 4/2007 | Kanou et al. .................. | 713/156 |
| 2007/0107042 | A1 * | 5/2007 | Corona ............................ | 726/2 |
| 2007/0127051 | A1 * | 6/2007 | Sakayama et al. ........... | 358/1.14 |
| 2007/0273896 | A1 * | 11/2007 | Yamamura .................... | 358/1.1 |

FOREIGN PATENT DOCUMENTS

JP   2004-362551   12/2004
JP   2006-251904   9/2006

* cited by examiner

*Primary Examiner* — Nathan Flynn
*Assistant Examiner* — Trang Doan
(74) *Attorney, Agent, or Firm* — Harness, Dickey & Pierce, P.L.C.

(57) ABSTRACT

An information processing apparatus includes a hard disk drive (HDD) that stores therein user information, an operating unit that performs an operation of setting of user authentication, a user information registering unit that registers user information for a user who are permitted to use a function, and a system control unit that controls registration of the user information to the user information registering unit. An authentication server reads out the user information from the HDD and authenticates use permission of functions in the information processing apparatus. The system control unit controls registerability of the user information to the user information registering unit for each function with use permission determined by the information processing apparatus.

14 Claims, 23 Drawing Sheets

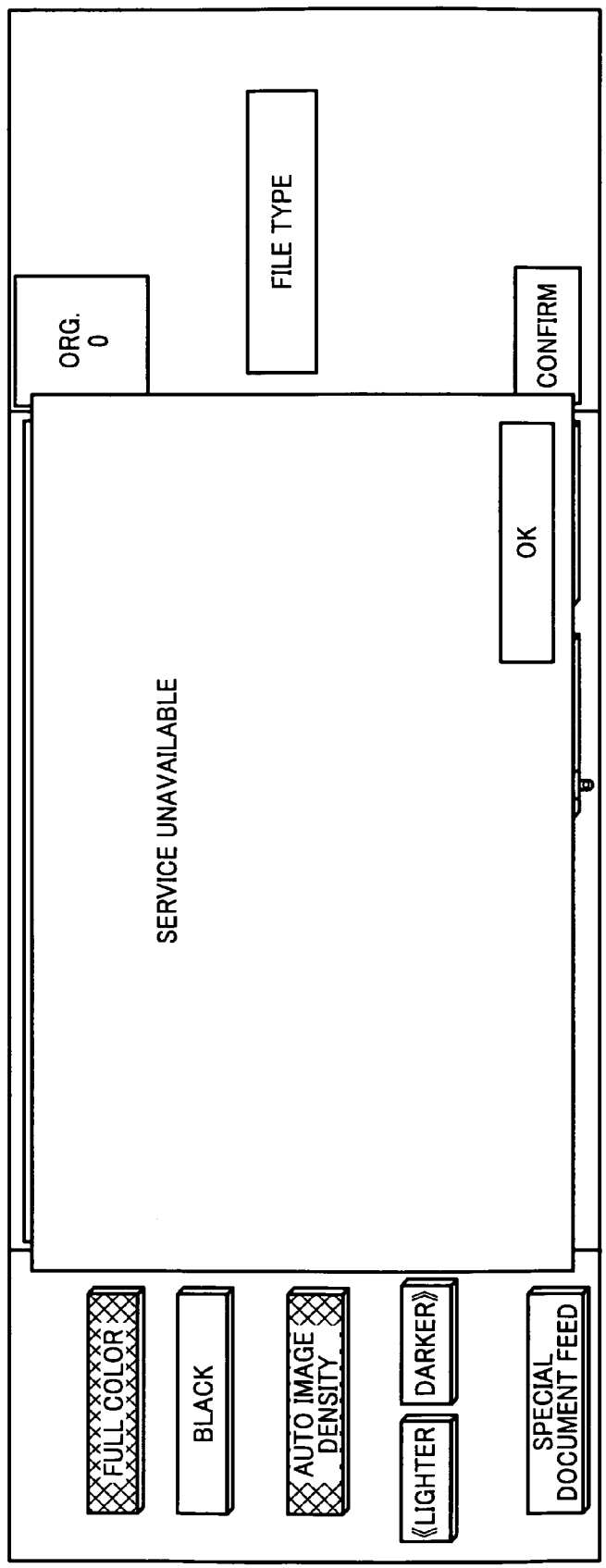

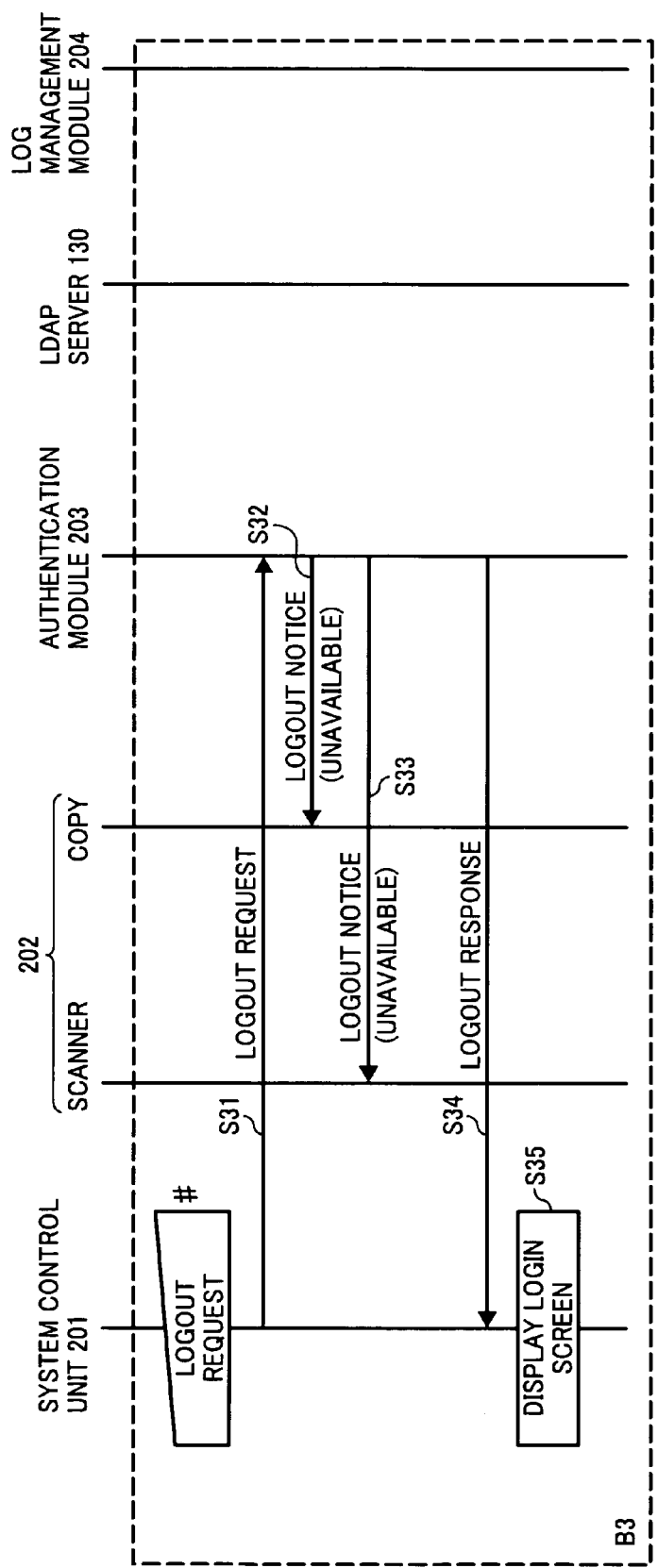

FIG. 16A

| SUZUKI TARO | |
|---|---|
| NAME | Taro Suzuki |
| USER ID (LOGIN NAME) | AA35213 |
| PASSWORD | NDhIQDQ4RDgsLEBYQ |
| E-MAIL ADDRESS | Taro.S@xxx.ricoh.co.jp |
| TELEPHONE NUMBER | +81-33777-XXXX |
| COPY: FULL COLOR | PERMITTED |
| COPY: 2 COLORS | PERMITTED |
| COPY: 1 COLOR | PERMITTED |
| COPY: BLACK | PROHIBITED |
| SCANNER: FULL COLOR | PROHIBITED |
| SCANNER: BLACK | PROHIBITED |
| EXPIRE CONTROL | YES |
| EXPIRE DATE | 2007/XX/XX |

FIG. 16B

| YAMADA HANAKO | |
|---|---|
| NAME | Hanako Yamada |
| USER ID (LOGIN NAME) | AA58325 |
| PASSWORD | alkdDK0Ffdk43LJ |
| E-MAIL ADDRESS | Hanako.Y@xxx.ricoh.co.jp |
| TELEPHONE NUMBER | +81-8111-XXXX |
| COPY: FULL COLOR | PROHIBITED |
| COPY: 2 COLORS | PROHIBITED |
| COPY: 1 COLOR | PROHIBITED |
| COPY: BLACK | PERMITTED |
| SCANNER: FULL COLOR | PROHIBITED |
| SCANNER: BLACK | PERMITTED |
| EXPIRE CONTROL | NO |
| EXPIRE DATE | NOT SPECIFIED |

FIG. 17A

| NAME | TARO SUZUKI |
|---|---|
| USER ID (LOGIN NAME) | AA35213 |
| ACQUISITION SOURCE | LDAP SERVER |

FIG. 17B

| NAME | HANAKO YAMADA |
|---|---|
| USER ID (LOGIN NAME) | AA58325 |
| ACQUISITION SOURCE | MFP |

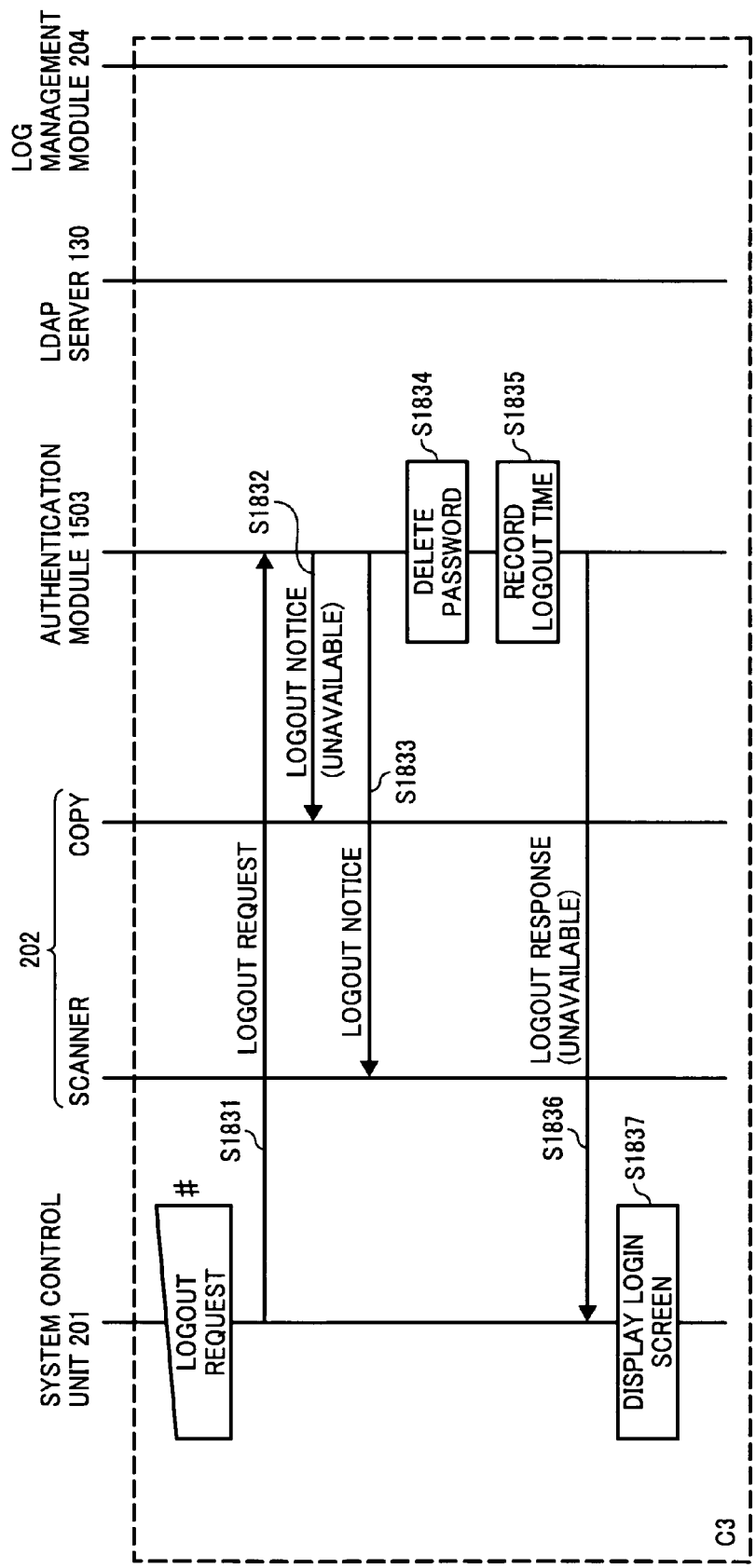

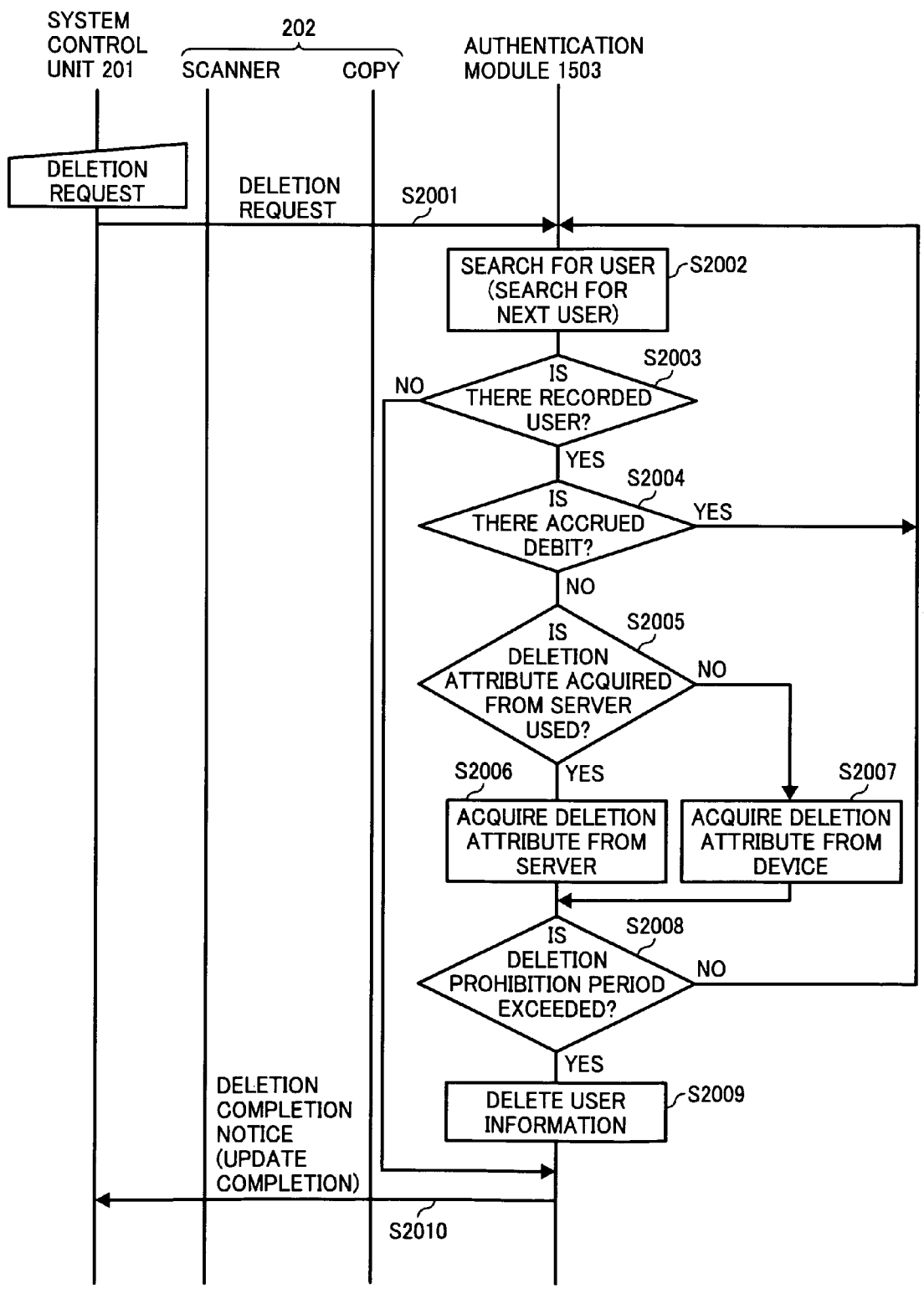

INFORMATION PROCESSING APPARATUS, USER INFORMATION MANAGING METHOD, AND COMPUTER PROGRAM PRODUCT

CROSS-REFERENCE TO RELATED APPLICATIONS

The present application claims priority to and incorporates by reference the entire contents of Japanese priority document, 2006-241888 filed in Japan on Sep. 6, 2006 and Japanese priority document, 2007-194657 filed in Japan on Jul. 26, 2007.

BACKGROUND OF THE INVENTION

1. Field of the Invention

The present invention generally relates to an information processing apparatus, and specifically relates to a technology for controlling usage of an information processing apparatus.

2. Description of the Related Art

An environment is available in which a plurality of devices, such as multifunction products (MFP) or laser printers, are connected to a network, and users are allowed to use those devices after user authentication is performed in an authentication server. In such an environment, the authentication server manages information about the users, which user is allowed to use which device, which user is allowed to use which function on which device, and the like.

In some cases, devices may be used not only by users who are managed by the authentication server but by other users who are not managed by the authentication server, within a range of respective use permission. For example, there may be a situation where anybody is permitted to use a copy function in an MFP, while only authentic users may be permitted to use a scan transmission function for transmitting scanned data to other devices via a network, or a facsimile transmission function. However, the available number of users to be managed in a server and the available number of users to be managed in devices, such as an MFP, often vary from each other. Therefore, various limitations are inevitably posed on management and control of such devices.

For counteracting above problems, Japanese Patent Application Laid-Open No. 2004-325881 discloses a conventional technology for managing user information. In the conventional technology, a server manages user information of users designated to use devices in above system environments, and the server updates user information managed by an information management device when the user information in the server is changed.

However, in the conventional technology, a lot of memory space is required if the number of users increases.

SUMMARY OF THE INVENTION

It is an object of the present invention to at least partially solve the problems in the conventional technology.

According to an aspect of the present invention, there is provided an information processing apparatus connected to an external server via a network. The external server stores therein user information containing user identification information unique to a user in association with use permission information indicative of permission for using functions of the image processing apparatus, and user usage information containing the user identification information in association with usage information indicative of usage of the information processing apparatus by the user. The information processing apparatus includes a storing unit capable of storing therein information; a transmitting unit that transmits user identification information of a user to the external server upon receiving the user identification information from the user; a receiving unit that receives user information and user usage information corresponding to the user identification information from the external server; and a control unit that controls an operation of storing the user information and the user usage information in the storing unit based on the use permission information included in the user information received by the receiving unit.

According to another aspect of the present invention, there is provided a method of managing user information that is implemented on a processing apparatus connected to an external server via a network. The external server stores therein user information containing user identification information unique to a user in association with use permission information indicative of permission for using functions of the image processing apparatus, and user usage information containing the user identification information in association with usage information indicative of usage of the information processing apparatus by the user. The method includes transmitting user identification information of a user to the external server upon receiving the user identification information from the user; receiving user information and user usage information corresponding to the user identification information from the external server; and controlling an operation of storing the user information and the user usage information in a storing unit based on the use permission information included in the user information received at the receiving.

According to still another aspect of the present invention, there is provided a computer program product that includes a computer-readable recording medium that stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a schematic diagram of an example of a function unavailable screen displayed on the operating unit shown in FIG. 2;

FIGS. 13A to 13C are sequence diagrams of a user-information management process according to the first embodiment;

FIGS. 16A and 16B are tables of examples of contents of user information according to the second embodiments;

FIGS. 17A and 17B are examples of contents of an acquisition source table according to the second embodiment;

FIGS. 18A to 18C are flowcharts of a user-information management process according to the second embodiment; and FIG. 19 is a flowchart of a user-information deletion process according to the second embodiment.

DETAILED DESCRIPTION OF THE PREFERRED EMBODIMENTS

Exemplary embodiments of the present invention are explained in detail below with reference to the accompanying drawings. In the embodiments below, it is explained that an information processing apparatus of the present invention is applied to a multifunction product that includes functions of printer, copying machine, facsimile, and scanner in a body. However, the present invention is not limited to the multifunction product, and can be applied to image forming apparatuses, such as copying machines, facsimile machines, and scanners, or other apparatuses including a computer as long as the apparatuses can execute predetermined functions.

Figure 1:
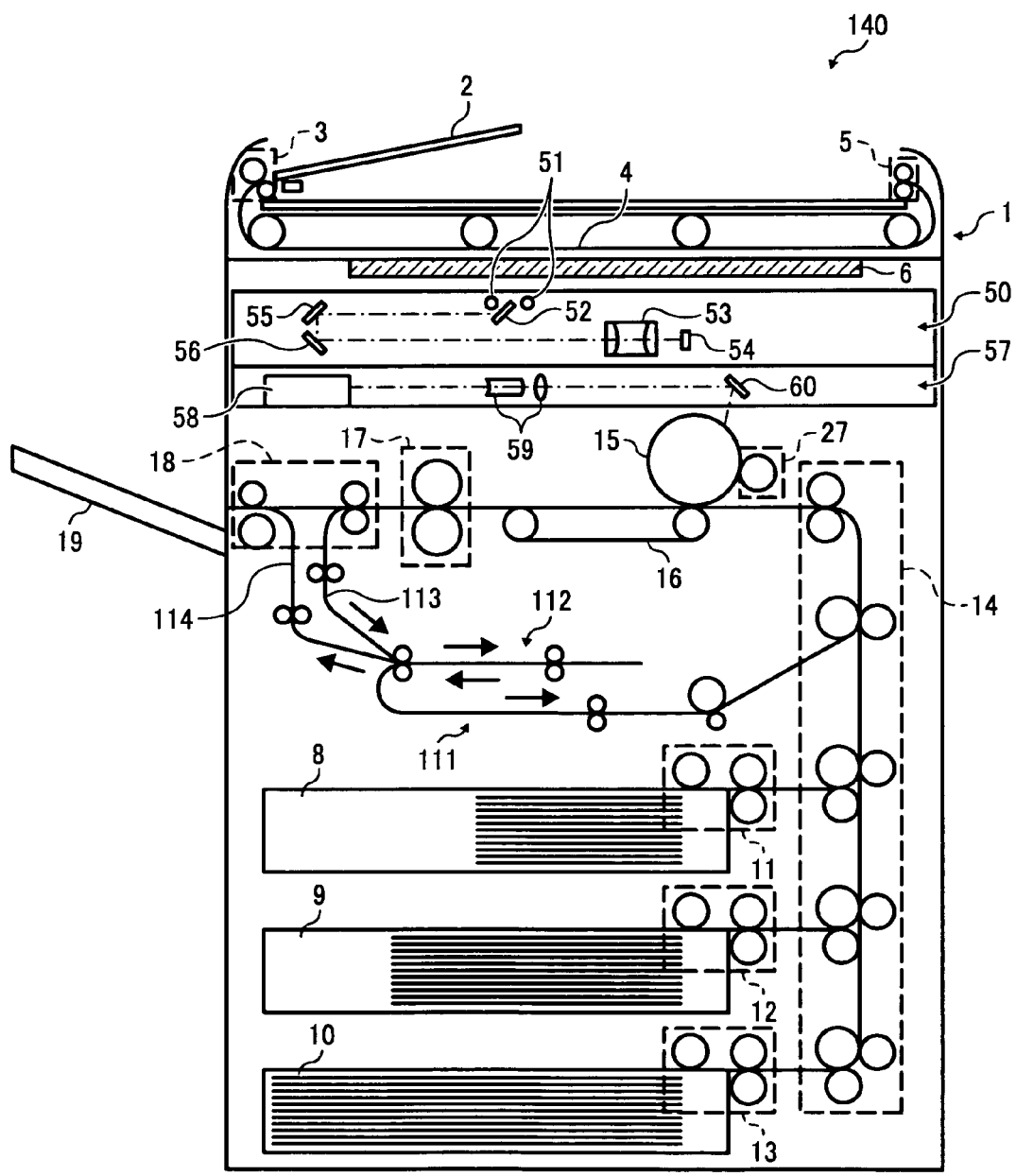
FIG. 1 is a side view of a mechanical configuration of a multifunction product according to a first embodiment of the present invention.

FIG. 1 is a side view of a mechanical configuration of a multifunction product (MFP) 140 according to a first embodiment of the present invention. Assume now that stack of documents is put on a document feeder 2 on an automatic document feeder (ADF) 1 with images on the documents side up. When the start key 34 on an operating unit 30 is pressed, a document at the bottommost of the stack of documents is fed to a predetermined position on a contact glass 6 by a feed roller 3 and a feed belt 4. The MFP 140 includes a count up function for counting up the number of documents upon completion of feed of a document. A reading unit 50 reads image data on a document fed onto the contact glass 6, and the document of which image data has been read is discharged by the feed belt 4 and a discharge roller 5.

Each of a first paper feeder 11, a second paper feeder 12, and a third paper feeder 13 feeds a transfer paper from stack of transfer papers set in each of a first tray 8, a second tray 9, and a third tray 10, and the transfer paper is transferred to a position in contact with a photoconductor 15 by a vertical transfer unit 14. The image data read by the reading unit 50 is written onto the photoconductor 15 using a laser from a writing unit 57, and a toner image is formed on the photoconductor 15 by a developing unit 27. The transfer paper is transferred by a transfer belt 16 at the same speed as rotation of the photoconductor 15, so that the toner image on the photoconductor 15 is transferred onto the transfer paper. A fixing unit 17 fixes the toner image onto the transfer paper, and the transfer paper is discharged to a discharge tray 19 by a discharge unit 18.

When images are formed on both sides of a transfer paper, a transfer paper fed from each of the trays 8 to 10 to form an image is not led to a side of the discharge tray 19 upon forming an image on a front surface of the transfer paper, but transferred to a two-sided paper feed path 113. Accordingly, the transfer paper is switched back by an inverting unit 112 and transferred to a two-sided transfer unit 111.

The transfer paper transferred to the two-sided transfer unit 111 is re-transferred to the vertical transfer unit 14 to print an image on a back surface of the transfer paper. After the image is printed on the back surface, the transfer paper is discharged.

When a transfer paper is discharged in an inverted state, the transfer paper switched back by the inverting unit 112 is not transferred to the two-sided transfer unit 111 but transferred to an inverted-paper discharge path 114 to discharge the transfer paper.

A main motor 25 drives each of the photoconductor 15, the transfer belt 16, the fixing unit 17, the discharge unit 18, and the developing unit 27. Paper feed clutches 22 to 24 respectively conveys drive force of the main motor 25 to drive the paper feeders 11 to 13. An intermediate clutch 21 conveys drive force of the main motor 25 to drive the vertical transfer unit 14.

Processes from a read of image data to formation of latent image onto a recording medium performed by the MFP 140 is described with reference to FIG. 1. The latent image is electric potential distribution generated by applying optical data converted from an image data onto the photoconductor 15.

The reading unit 50 includes the contact glass 6 on which a document is placed and an optical scanning system. The optical scanning system includes an exposure lamp 51, a first mirror 52, a lens 53, a charge-coupled device (CCD) image sensor 54, and the like. The exposure lamp 51 and the first mirror 52 are fixed on a first carriage (not shown), and the lens 53 and the CCD image sensor 54 are fixed on a second carriage (not shown). When reading image data on a document, the first carriage and the second carriage are mechanically scanned at a relative velocity of two to one for preventing change in optical length. The optical scanning system is driven by a scanner drive motor (not shown). Image data on the document is read by the CCD image sensor 54 and converted into an electrical signal to be processed. By shifting the lens 53 and the CCD image sensor 54 in a horizontal direction in an example shown in FIG. 1, magnification of an image is changed. In other words, positions of the lens 53 and the CCD image sensor 54 are appropriately changed in the horizontal direction depending on specified magnification.

The writing unit 57 includes a laser output unit 58, an imaging lens 59, and a mirror 60. The laser output unit 58 accommodates a laser diode as a laser source and a rotatable polygon mirror that performs a constant-high-speed rotation using a motor. Laser beam applied from the laser output unit 58 is polarized by the polygon mirror rotating at a constant speed, passes through the imaging lens 59, is reflected by the mirror 60, and is condensed on the photoconductor 15 to form an image.

Figure 2:
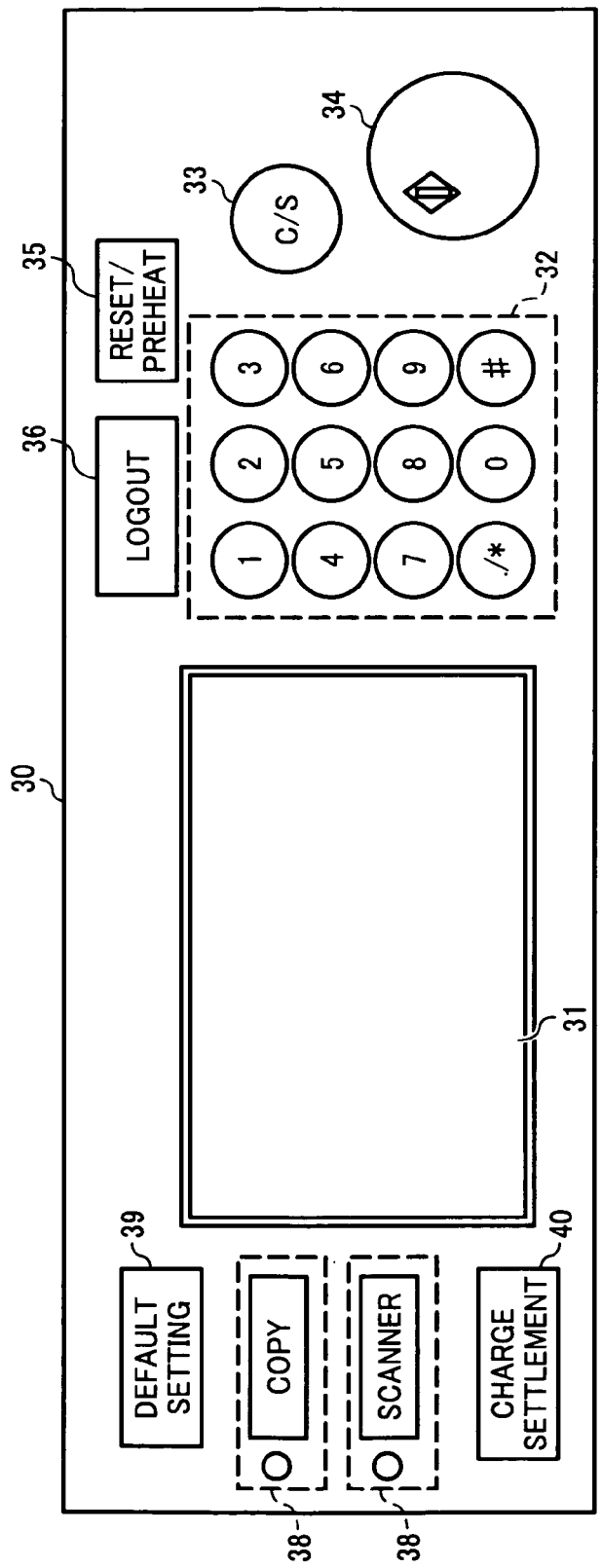
FIG. 2 is a schematic diagram of on operating unit of the multifunction product shown in FIG. 1.

FIG. 2 is a schematic diagram of the operating unit 30. The operating unit 30 includes a liquid-crystal touch panel 31, a numeric keypad 32, a clear/stop key 33, a start key 34, a reset/preheat key 35, a logout key 36, and the like. The liquid-crystal touch panel 31 displays thereon a function key 37 (see FIG. 3), the number of sets of documents, messages indicative of state of an image forming apparatus, and the like. The messages indicate paper jam, door open, cover open, and the like.

Reference numeral 38 indicates application selecting keys for selecting applications, and light emitted diode (LED)

indicators that indicate a currently selected application. When a user operates one of the application selecting keys 38, a screen corresponding to the operated application selecting key 38 is displayed on the liquid-crystal touch panel 31.

By pressing a default setting key 39, it is possible to retrieve a screen for customizing a default setting of the MFP 140 as appropriate. For example, it is possible to set a paper size placed in the MFP 140, and perform registration and change of setting of user authentication.

When the reset/preheat key 35 is pressed, the MFP 140 shifts its state from standby mode to power-saving mode (preheat mode), lowers temperature inside the fixing unit 17, and turns OFF a display of the operating unit 30. In the situation that the MFP 140 is in the preheat mode, when any keys on the operating unit 30 is pressed, the MFP 140 shifts its state from the preheat mode to the standby mode.

The reset/preheat key 35 and the logout key 36 are exclusively in operable state for a user who is going to login to the MFP 140.

Figure 3:
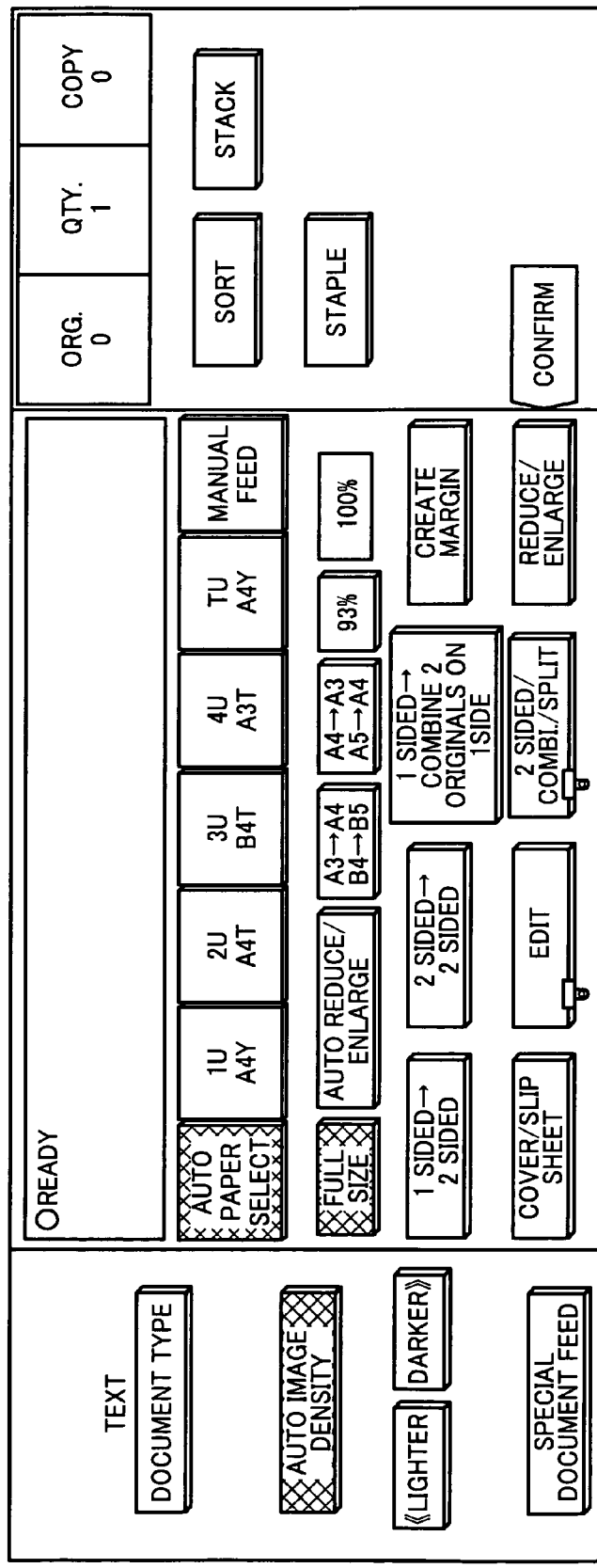
FIG. 3 is a schematic diagram of an example of a liquid-crystal touch panel of the operating unit shown in FIG. 2.

FIG. 3 is a schematic diagram of an example of display on the liquid-crystal touch panel 31. When an operator touches a key indicative of a selected function displayed on the liquid-crystal touch panel 31, the key is inverted into black. For specifying details of a function (e.g., a variation value for changing paper size), a setting screen for detailed function is displayed by touching the inverted key. In this manner, because the liquid-crystal touch panel 31 is constituted of a dot-display device, it is possible to display an optimal graphical screen. In this manner, setting of user authentication and an authentication process are performed by using the operating unit 30.

Figure 4:
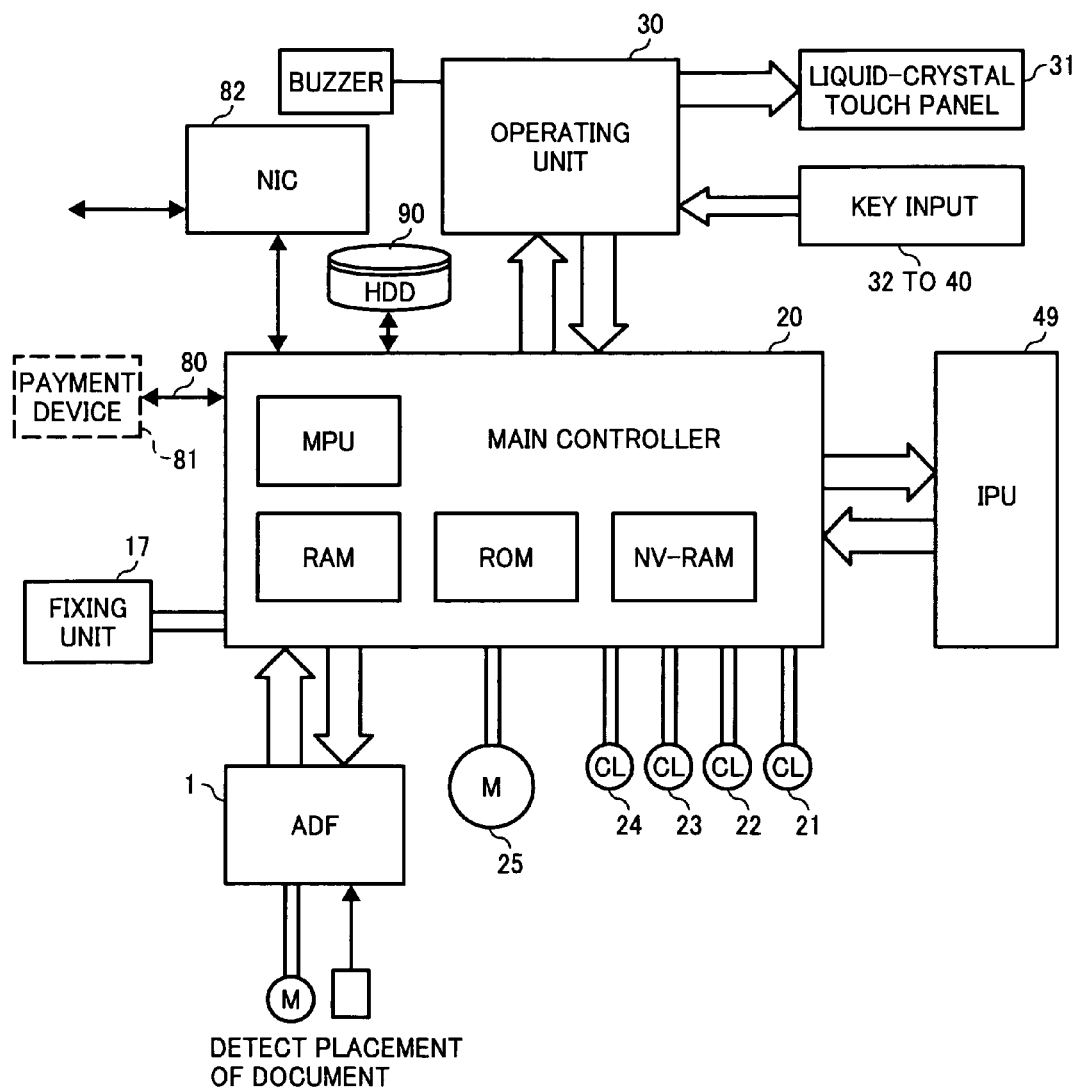
FIG. 4 is a schematic diagram of a hardware configuration of the multifunction product shown in FIG. 1.

FIG. 4 is a schematic diagram of a hardware configuration of the MFP 140. The MFP 140 includes a main controller 20. The main controller 20 includes a micro processing unit (MPU), a read only memory (ROM), a random access memory (RAM), and a non-volatile RAM (NV-RAM), and controls entirety of the MFP 140. The main controller 20 is connected to distributed control devices. The distributed control devices are, e.g., the operating unit 30 that performs a display in response to an instruction from an operator and controls input of setting of functions input by an operator, an image processing unit (IPU) 49 that controls scanners, a process of writing image data on a document in an image memory, a process of forming an image from the image memory, and the ADF 1. The distributed control devices and the main controller 20 exchange information on state of a machine or an operation command with each other as appropriate. In addition, the main motor 25, the various clutches 21 to 24, which are necessary for feeding papers, the fixing unit 17, and a hard disk drive (HDD) 90 that stores therein user information and user management information described later are connected to the main controller 20.

A charge device interface (I/F) 80 that is a serial communication I/F for a communication with a payment device 81, the externally connected payment device 81, and a network interface (NIC) 82 for a communication with an authentication/user-information management server using lightweight directory access protocol (LDAP) are connected to the main controller 20. The main controller 20 controls communications of the charge device I/F 80, the payment device 81, and the NIC 82. The payment device 81 withdraws amounts of money corresponding to amounts charged from the MFP 140 from inserted coins, and returns accrued debit.

Figure 5:
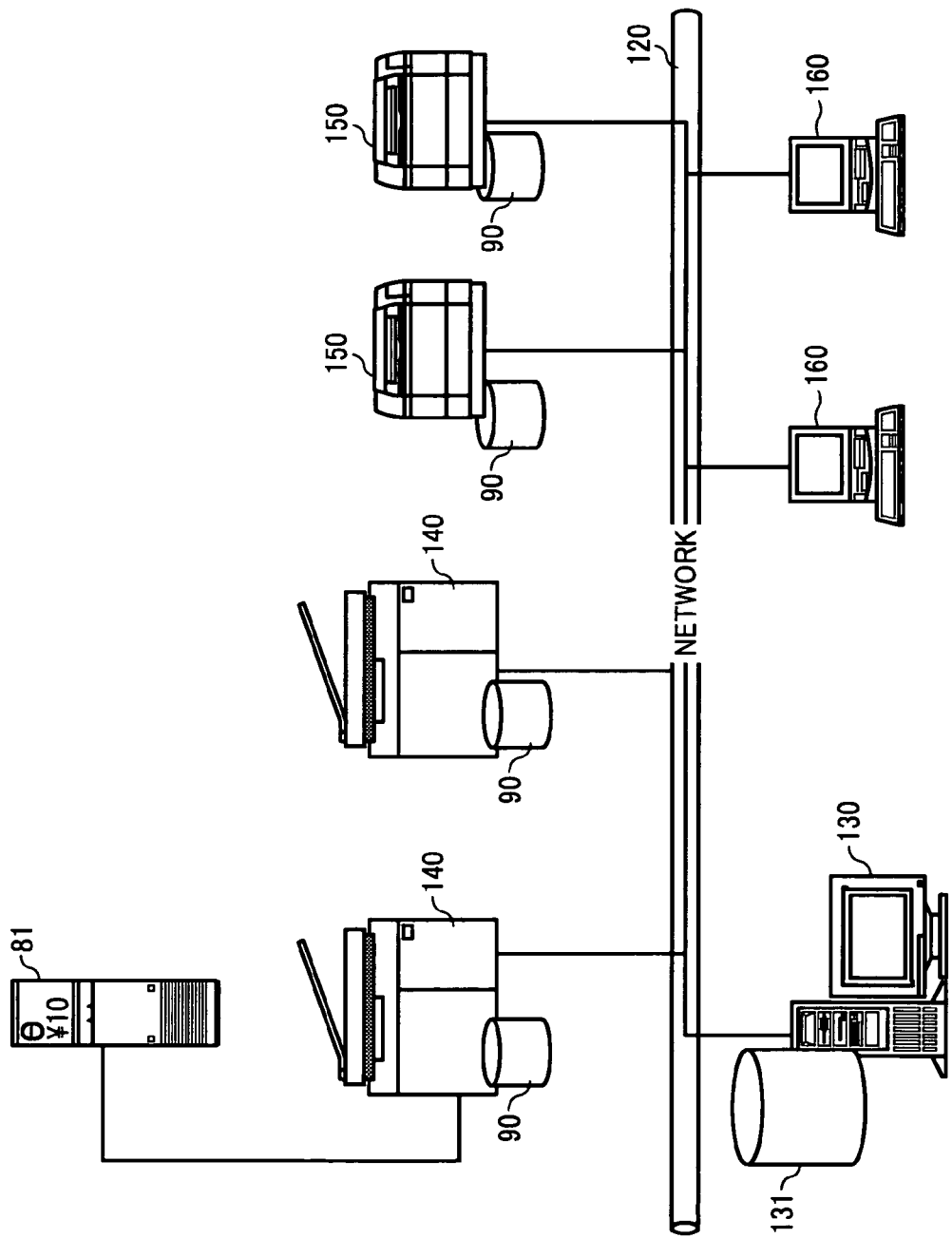
FIG. 5 is a schematic diagram of a network configuration of a user-information management system according to the first embodiment.

FIG. 5 is a schematic diagram of a network configuration of a user-information management system according to the first embodiment. Each of an authentication/user-information management server (hereinafter, described as "authentication server", "external server", or "LDAP server" as appropriate) 130, the MFP 140, a laser printer (LP) 150, and a client personal computer (PC) 160 are communicably connected with one another via a network 120 such as the Internet. In addition, the payment device 81 is connected to the MFP 140. The authentication server 130 includes an HDD 131 that stores therein user information.

An LDAP server that operates in conformity with LDAP protocol is used as the authentication server 130. The authentication server 130 receives user authentication request from the MFP 140 by the LDAP protocol, and returns authentication result to the MFP 140 in reference to the user information.

Figure 6:
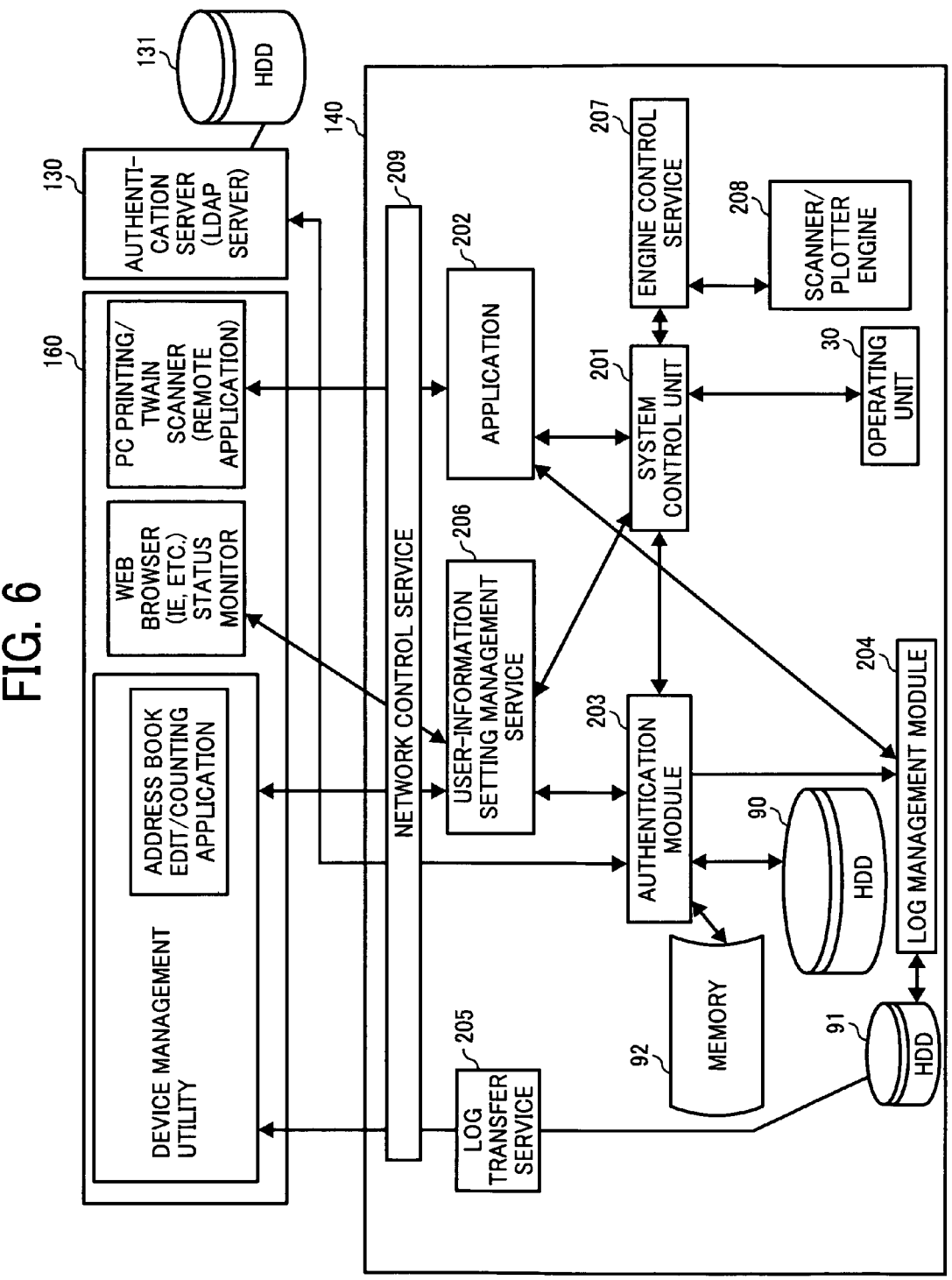
FIG. 6 is a block diagram of a functional configuration of the multifunction product shown in FIG. 1.

FIG. 6 is a block diagram of a functional configuration of the MFP 140. The LP 150 has the same or similar functional configuration as that of the MFP 140, and therefore, explanation thereof is omitted.

As shown in FIG. 6, the MFP 140 includes a network control service 209, an application 202 indicative of applications of copying machine, scanner, printer, and facsimile, a user-information setting management service 206, a log transfer service 205, a system control unit 201, an engine control service 207, an authenticated-user information management module (hereinafter, "authentication module") 203, a log management module 204, the operating unit 30, and a scanner/plotter engine 208.

The system control unit 201 manages and controls a login/logout process instructed by a user, and controls entirety of the MFP 140.

The network control service 209 receives and transmits various data from/to the client PC 160 or the authentication server 130. According to the first embodiment, it is assumed that the network control service 209 performs a communication with the authentication server 130 in conformity with LDAP protocol to transmit a user authentication request to the authentication server 130 and receive user information as a response to the user authentication request from the authentication server 130.

The application 202 serves as applications that respectively function as copying machine, scanner, printer, and facsimile on the MFP 140, and includes each different application for each of the functions.

The scanner/plotter engine 208 is hardware that performs scanning and printing. The engine control service 207 performs execution control of the scanner/plotter engine 208.

The user-information setting management service 206 sends user information received from the authentication server 130 to the authentication module 203 to perform setting and management of the user information.

The authentication module 203 manages user authentication using the authentication server 130, temporary storage or deletion of user information and user management information, e.g., charge information, in/from a memory 92, and storage of user information and user management information in the HDD 90.

The log management module 204 records log information, which is execution log for each application included in the application 202, in an HDD 91 for each user. The authentication module 203 controls the log management module 204 to record the log information in the HDD 91.

The log transfer service 205 reads out log information recorded in the HDD 91, and transmits the log information to the client PC 160 via the network control service 209.

FIGS. 7 to 12 are schematic diagrams of examples of various screens that can be displayed on the operating unit 30. It is assumed in the first embodiment that the MFP 140 includes a copy application and a scanner application.

Figure 7:
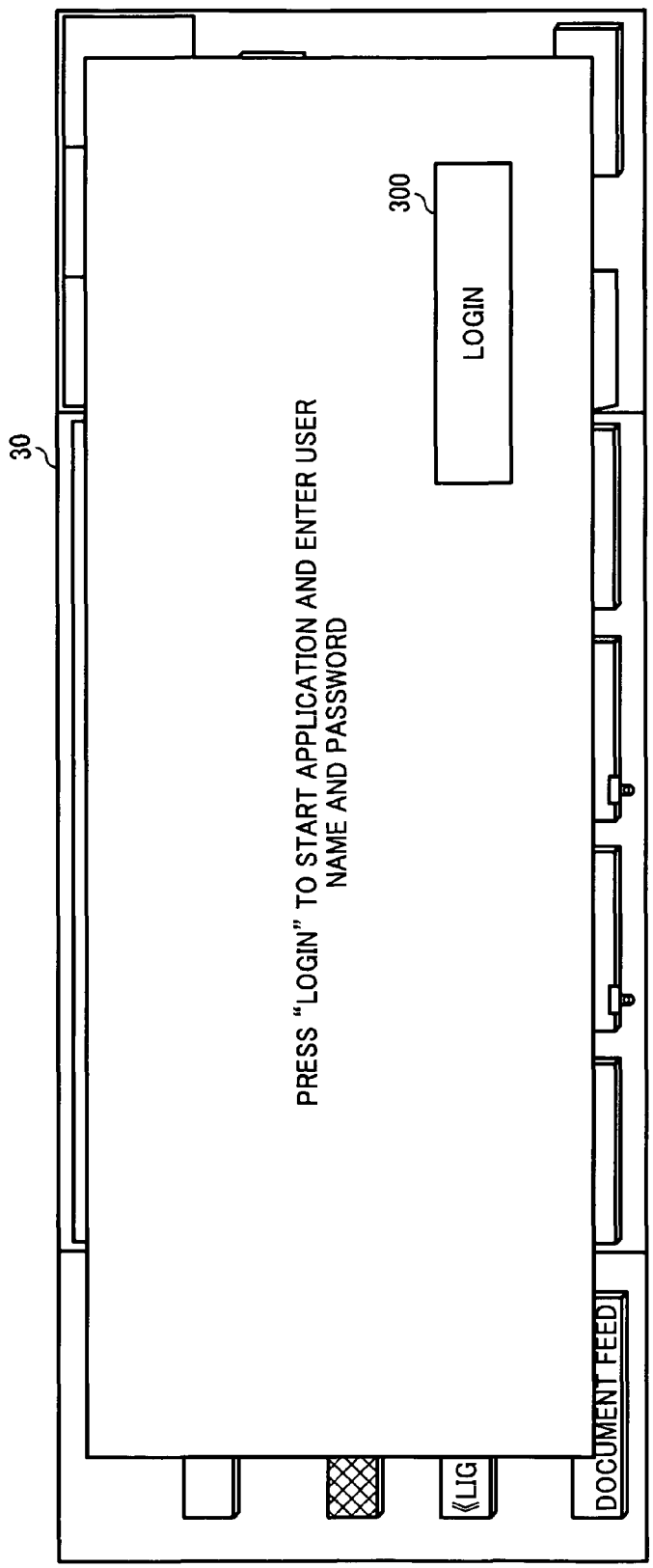
FIG. 7 is a schematic diagram of an initial screen (login screen) displayed on the operating unit shown in FIG. 2.
Figure 8:
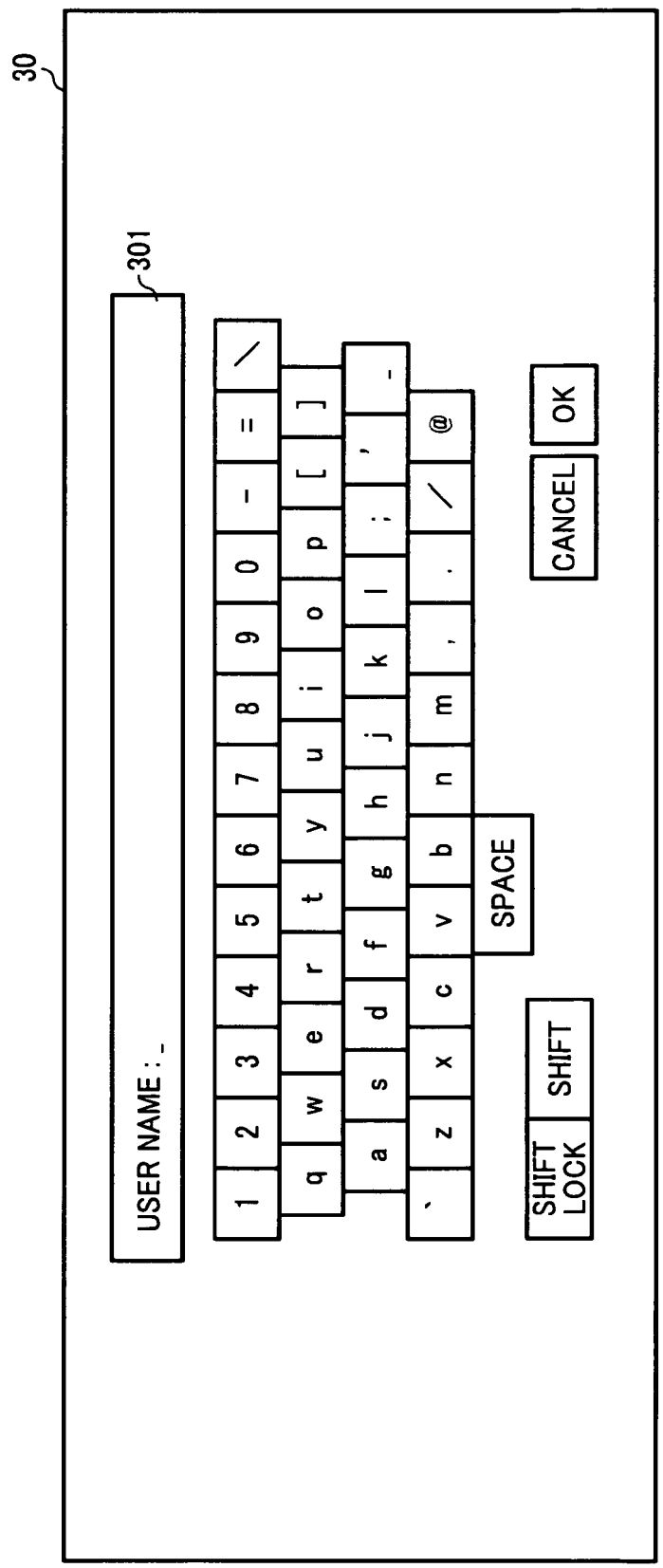
FIG. 8 is a schematic diagram of an example of a user-name entry screen displayed on the operating unit shown in FIG. 2.
Figure 9:
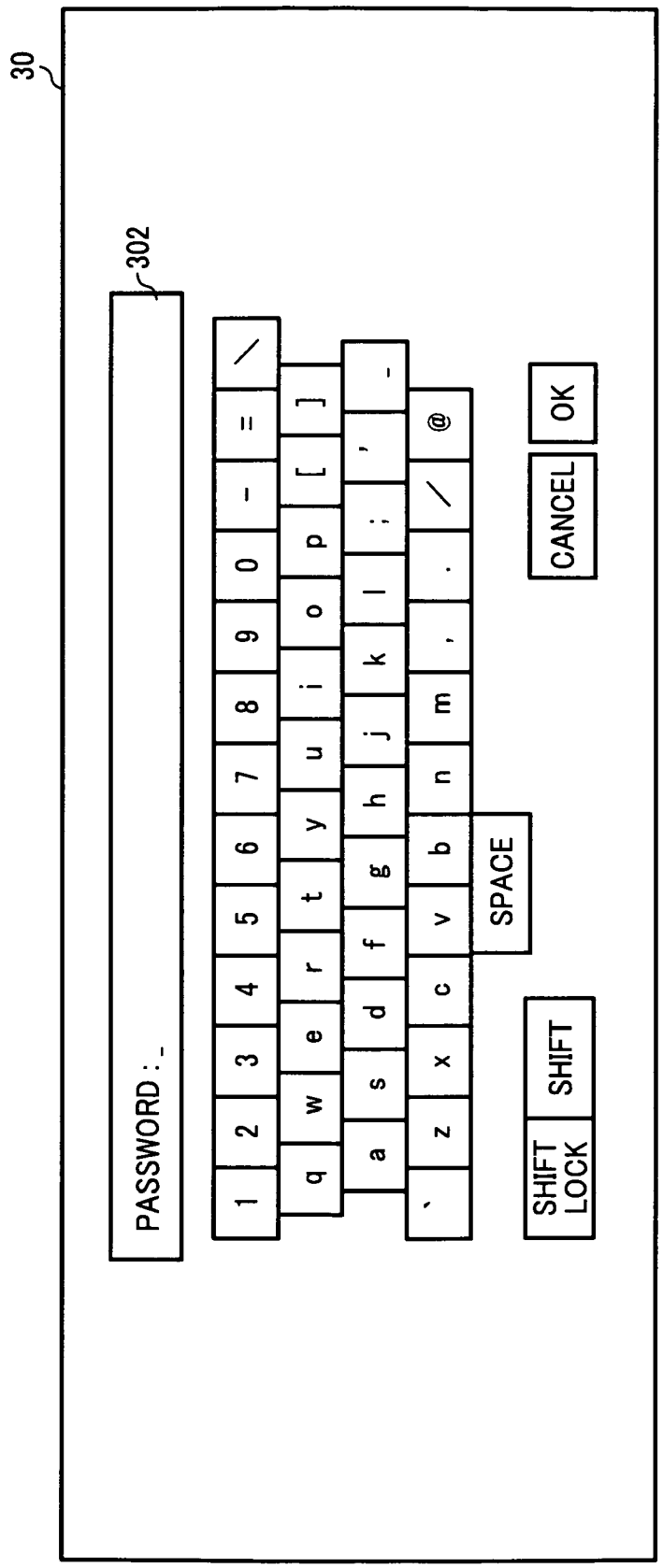
FIG. 9 is a schematic diagram of an example of a password entry screen displayed on the operating unit shown in FIG. 2.
Figure 10:
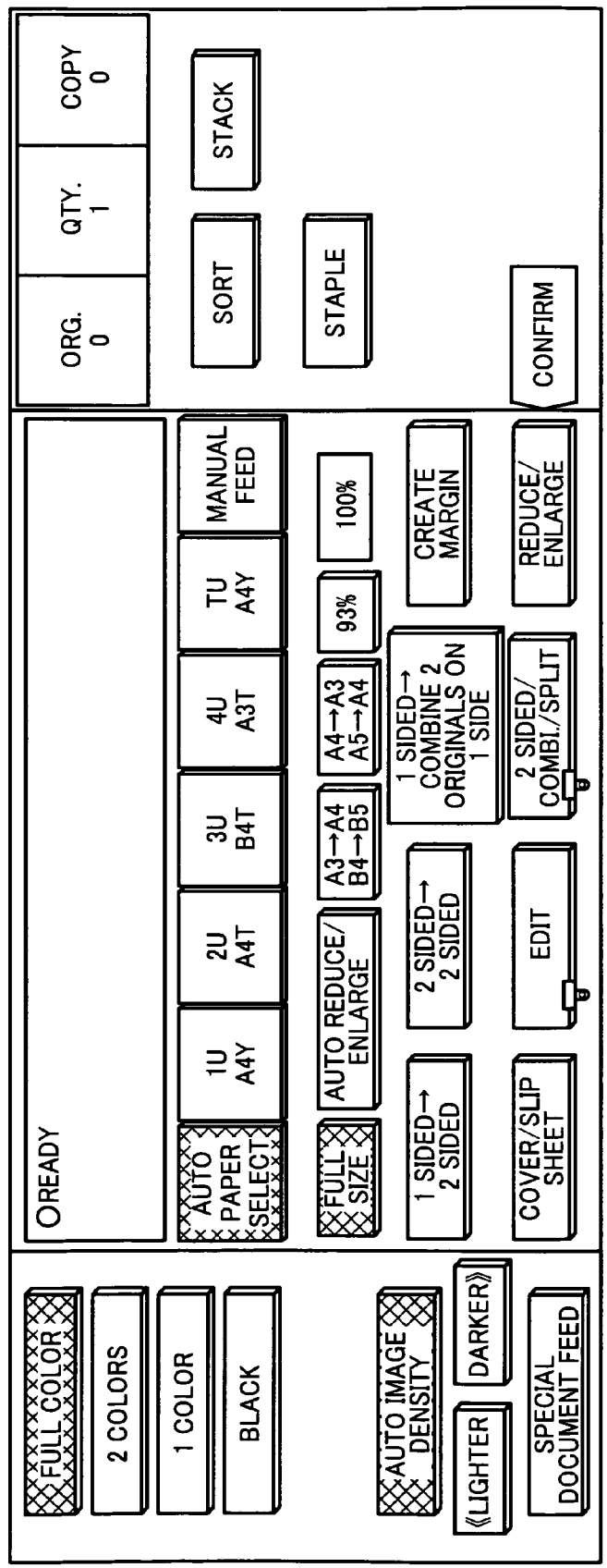
FIG. 10 is a schematic diagram of a typical initial screen displayed on the operating unit shown in FIG. 2.
Figure 11:
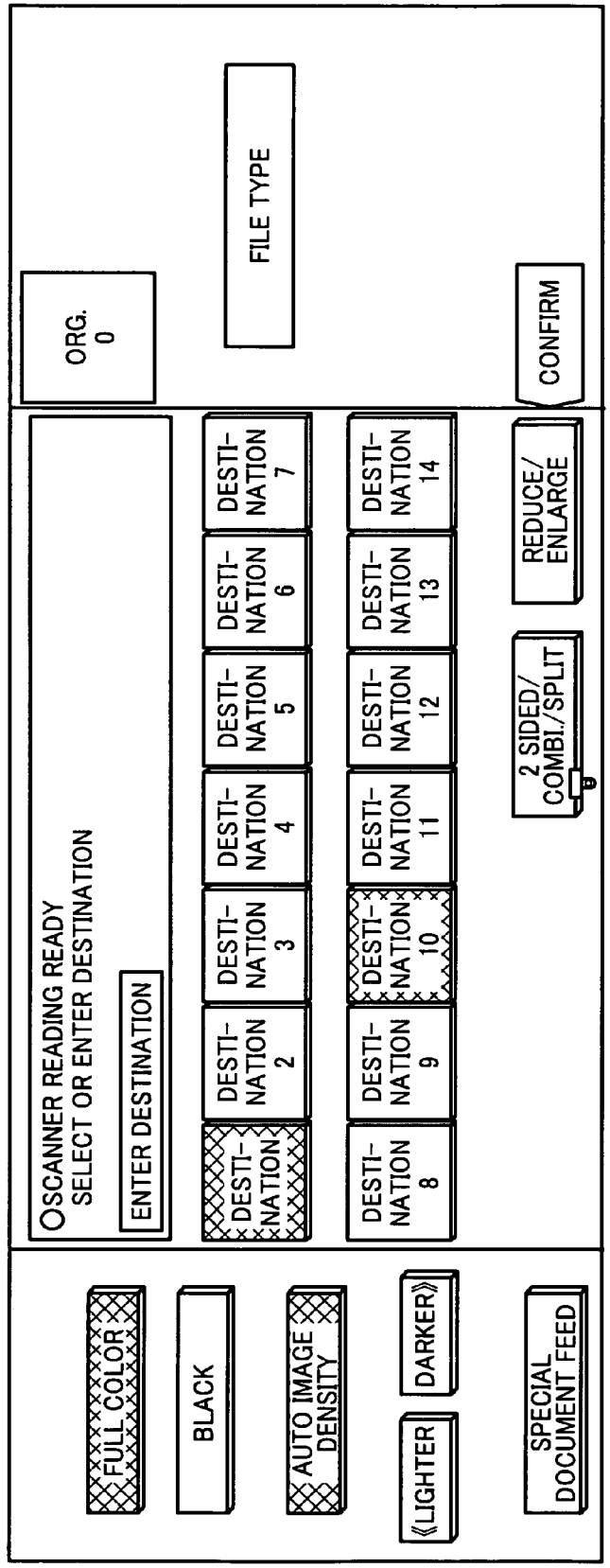
FIG. 11 is a schematic diagram of an example of an application (scanner function) ready-for-use screen displayed on the operating unit shown in FIG. 2.

FIG. 7 is a schematic diagram of an initial screen. Upon pressing a login button 300, a user enters a user name (login name) 301 and a password 302 using a soft keyboard shown in FIGS. 8 and 9. After the user name and the password are entered, the MFP 140 performs authentication with the LDAP server 130, and displays a screen indicating application is ready or unavailable as shown in FIGS. 10 to 12 depending on use permission of the user.

Table 1 is an example of charge level setting for each of the copy application and the scanner application set in the MFP 140. As shown in Table 1, a charge level for one page for each color mode is set in the MFP 140 using a default setting screen or a remote setting tool. The above setting of the MFP 140 is stored in NV-RAM (not shown) in the MFP 140.

TABLE 1

|  | MODE | LEVEL |
|---|---|---|
| COPY | FULL COLOR | 5 |
|  | 2 COLORS | 3 |
|  | 1 COLOR | 2 |
|  | BLACK | 0 |
| SCANNER | FULL COLOR | 3 |
|  | BLACK | 0 |

User information stored in the HDD 131 of the authentication server 130 contains user identification information unique to a user in association with use permission information indicative of availability of each of applications, as a function of the MFP 140, and their modes. The user information is stored in the HDD 90 of the MFP 140.

Table 2 is an example of user information stored in the HDD 131. The user information contains user identification, such as name, login name, password, e-mail address, telephone number, in association with use permission information indicative of availability of applications and modes. The user information is recorded in the authentication server 130 in a following LDAP data interchange format (LDIP).

TABLE 2

| SUZUKI TARO | |
|---|---|
| NAME | Taro Suzuki |
| USER ID (LOGIN NAME) | AA35213 |
| PASSWORD | NDhIQDQ4RDgsLEBYQ |
| E-MAIL ADDRESS | Taro.S@xxx.ricoh.co.jp |
| TELEPHONE NUMBER | +81-33777-XXXX |
| COPY: FULL COLOR | PERMITTED |
| COPY: 2 COLORS | PERMITTED |
| COPY: 1 COLOR | PERMITTED |
| COPY: BLACK | PERMITTED |
| SCANNER: FULL COLOR | PROHIBITED |
| SCANNER: BLACK | PROHIBITED |
| YAMADA HANAKO | |
| NAME | Hanako Yamada |
| USER ID (LOGIN NAME) | AA58325 |
| PASSWORD | alkdDK0Ffdk43LJ |
| E-MAIL ADDRESS | Hanako.Y@xxx.ricoh.co.jp |
| TELEPHONE NUMBER | +81-8111-XXXX |
| COPY: FULL COLOR | PROHIBITED |
| COPY: 2 COLORS | PROHIBITED |
| COPY: 1 COLOR | PROHIBITED |
| COPY: BLACK | PERMITTED |
| SCANNER: FULL COLOR | PROHIBITED |
| SCANNER: BLACK | PERMITTED |

Figure 13A:
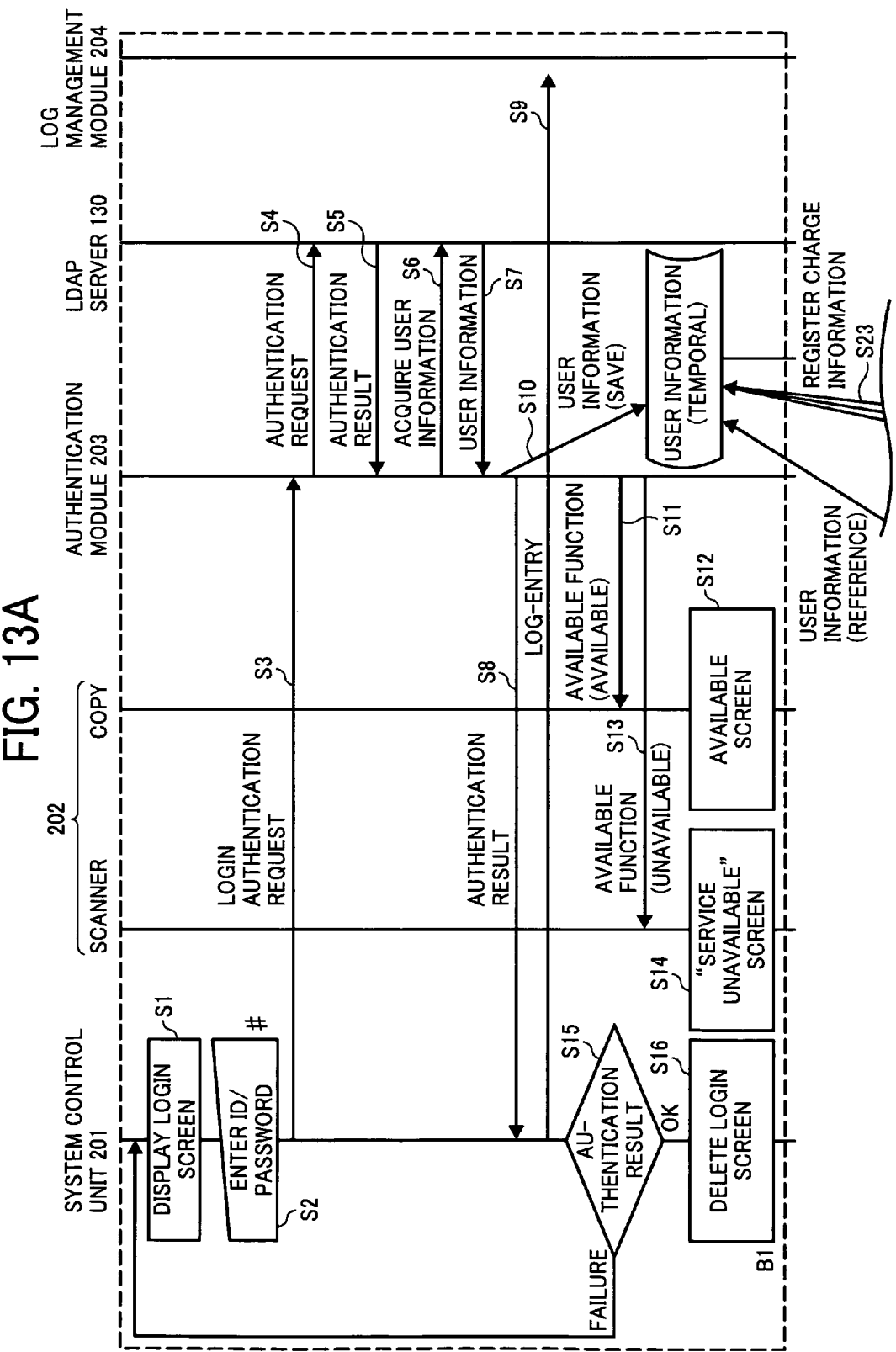
Figure 13B:
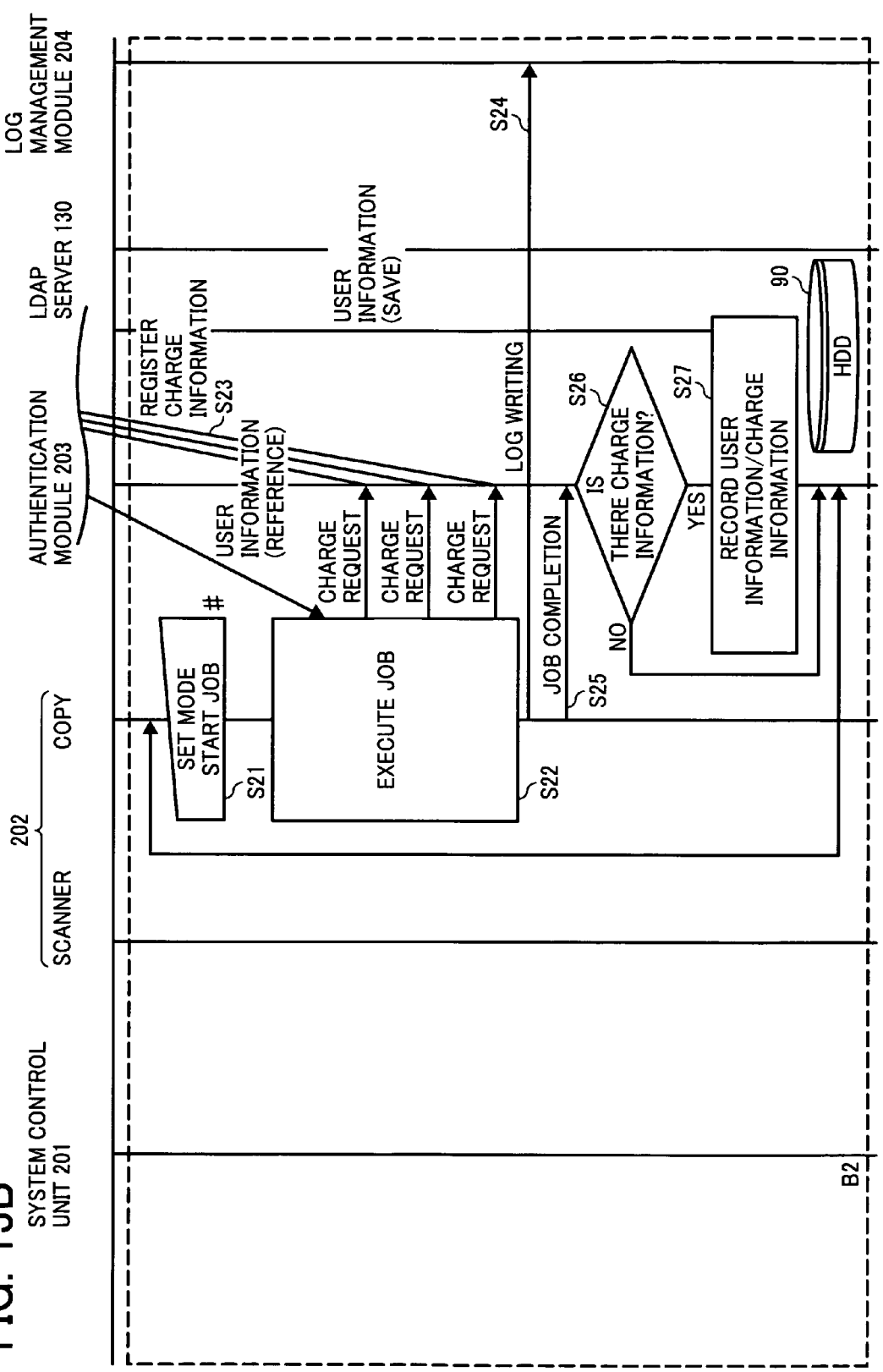

Taro Suzuki
dn: cn=Taro Suzuki, ou=MF, o=RICOH, c=JP
objectClass: person
c: JP
o: RICOH
ou: MF
cn: Taro Suzuki
sn: Suzuki
userid: AA35213
userPassword: NDhIQDQ4RDgsLEBYQ
mail: Taro.S@xxx.ricoh.co.jp
telephoneNumber: +81-33777-XXXX
availableCopyFullColor: TRUE
availableCopy2Color: TRUE
availableCopy1Color: TRUE
availableCopyBlack: TRUE
availableScannerFullColor: FALSE
availableScannerBlack: FALSE
Hanako Yamada
dn: cn=Hanako Yamada, ou=MF, o=RICOH, c=JP
objectClass: person
c: JP
o: RICOH
ou: MF
cn: Hanako Yamada
sn: Yamada
userid: AA58325
userPassword: alkdDK0Ffdk43LJ
mail: Hanako.Y@xxx.ricoh.co.jp
telephoneNumber: +81-8111-XXXX
availableCopyFullColor: FALSE
availableCopy2Color: FALSE
availableCopy1Color: FALSE
availableCopyBlack: TRUE
availableScannerFullColor: FALSE
availableScannerBlack: TRUE The MFP 140 sends a user authentication request to the authentication server 130 using LDAP protocol, and the authentication server 130 performs user authentication and returns authentication result to the MFP 140. When a user is authenticated, the MFP 140 sends a request of acquiring user information of an authenticated user to the LDAP server 130, receives the user information containing use permission information for each of functions in the MFP 140, and controls permission of use of applications based on the use permission information contained in received user information. FIGS. 13A to 13C are sequence diagrams of a user-information management process for controlling use permission according to the first embodiment. In below explanation, the user-information management process is separated into a login process shown in block B1 in FIG. 13A, a process of using applications shown in block B2 in FIG. 13B, and a logout process shown in block B3 in FIG. 13C. Processes indicated by "#" are performed by a user.

The login process shown in FIG. 13A is described below. Before the MFP 140 is activated, service of the MFP 140 is limited, with a display of the login screen shown in FIG. 7 (step S1). When a user enters user ID and user password into the MFP 140 (step S2), the system control unit 201 sends a login authentication request to the authentication module 203 (step S3). The authentication module 203 transmits the user ID, user password, and the user authentication request to the LDAP server 130 via the network control service 209 (step S4). Upon receiving the authentication request, the LDAP server 130 searches the HDD 131 whether there is information corresponding to a user based on authentication information. The LDAP server 130 returns authentication result as a response to the authentication request to the MFP 140 (step S5). The authentication result is notified by the authentication module 203 to the system control unit 201.

When the authentication result indicates authentication success, the authentication module 203 sends a request of acquiring user information of an authenticated user to the LDAP server 130 (step S6). The LDAP server 130 returns user information to the MFP 140 in response to the request (step S7). The authentication module 203 notifies the authentication result to the system control unit 201 (step S8). The system control unit 201 issues an instruction of writing log to the log management module 204. Upon receiving the instruction, the log management module 204 writes log records into the HDD 91 (step S9).

At step S5, a notice of authentication success is sent to the MFP 140. In this case, the authentication module 203 receives user information of an authenticated user from the LDAP server 130 at step S7, and temporarily stores the user information shown in Table 3 in the memory 92 (step S10). The MFP 140 controls application service based on use permission information contained in the user information.

Specifically, availability of functions including modes are notified to an application permitted for a user based on the use permission information (in the example shown in FIGS. 13A to 13C, copy application) (step S11). Accordingly, permitted application becomes available and a screen indicative of application ready is displayed on the operating unit 30 as shown in FIGS. 10 and 11 (step S12).

On the other hand, unavailability of functions indicative of unavailable applications are notified to an application prohibited for a user based on the use permission information (in the examples shown in FIGS. 13A to 13C, scanner application) (step S13). Accordingly, prohibited application is set to be unavailable for a user and a screen indicating application is unavailable is displayed on the operating unit 30 as shown in FIG. 12 (step S14).

The system control unit 201 determines contents of notified authentication result (step S15). When the authentication result indicates authentication success, (OK at step S15), the system control unit 201 clears the login screen (step S16). On the other hand, when the authentication result indicates authentication failure, (failure at step S15), the system control unit 201 keeps displaying the login screen (step S1).

TABLE 3

| Date | 2006/3/20 |
|---|---|
| Time | 10:30 AM |
| Userid | AA35213 |
| Name | Taro Suzuki |
| copyFC | 5 |
| copy2C | 0 |
| copy1C | 0 |
| copyBK | 22 |
| scanFC | 0 |
| scanBK | 0 |
| charge | 25 |
| date | 2006/3/25 |
| time | 2:30 PM |
| userid | AA58325 |
| name | Hanako Yamada |
| copyFC | 0 |
| copy2C | 0 |
| copy1C | 0 |
| copyBK | 2 |
| scanFC | 0 |
| scanBK | 3 |
| charge | 0 |

When user information of an authenticated user is acquired, and if there is an application of which use is prohibited based on the use permission information, part of the user identification information necessary for the prohibited application is not stored in the memory 92 and the HDD 90.

For example, when a user Taro Suzuki is authenticated and logs into the MFP 140, if a function of scanner transmission is prohibited based on the use permission information, information on e-mail address in the user identification information is not stored in the memory 92 and the HDD 90 because e-mail address is used exclusively when performing the scanner transmission.

The process of using applications shown in FIG. 13B is described below. When a user sets an available mode for a job of the copy application in the MFP 140 and executes the copy applications by performing a starting operation (step S21), the job is executed (step S22), to perform copying operation. The copy application sends a charge request to the authentication module 203 in response to a copying operation. Upon receiving the charge request, the authentication module 203 adds charge information to a temporary area in the memory 92 based on level settings shown in Table 1 (step S23). The authentication module 203 sends a request of recording log to the log management module 204, and the log management module records information on job execution in a format shown in Table 3 as log information to the HDD 90 (step S24).

Upon completing job execution, the copy application sends a job completion notice to the authentication module 203 (step S25). Upon receiving the job completion notice, the authentication module 203 checks whether there is charge information for the user in the temporary area of the memory 92 (step S26). When there is the charge information for the user (Yes at step S26), the authentication module 203 records the charge information shown in Table 4 from the memory 92 to the HDD 90, and records user information received from the LDAP server 130 to the HDD 90 (step S27). On the other hand, when there is no charge information for the user (No at step S26), the authentication module 203 does not record charge information to the HDD 90. When a user executes a plurality of jobs, above processes described in connection with FIG. 13B are repeated.

TABLE 4

| userid | AA35213 |
|---|---|
| name | Taro Suzuki |
| charge | 25 |
| userid | AA58325 |
| name | Hanako Yamada |
| charge | 0 |

The logout process shown in FIG. 13C is described below. When a user presses the logout key 36 on an operation panel, the system control unit 201 sends a logout request to the authentication module 203 (step S31). Upon receiving the logout request, the authentication module 203 performs a logout process. The authentication module 203 sends a logout notices indicative of prohibition of application to each of the applications (steps S32, S33), and sends a logout response indicative of logout completion to the system control unit 201 (step S34). Upon receiving the logout response, the system control unit 201 displays the login screen on the operating unit 30 (step S35), so that the MFP 140 is shifted to a service limited mode.

Although the user-information management process performed by the MFP 140 is explained in the first embodiment, if the LP 150 is employed, it is possible to realize the same functions as those of the first embodiment by the following configuration: a process performed by the system control unit 201 for receiving authentication information for login is performed by the client PC 160 (i.e., input of the authentication information is performed on the client PC 160); the client PC 160 sends input authentication information to the LP 150; and authentication is performed using the LDAP server 130 based on authentication information received by the LP 150.

Figure 14:
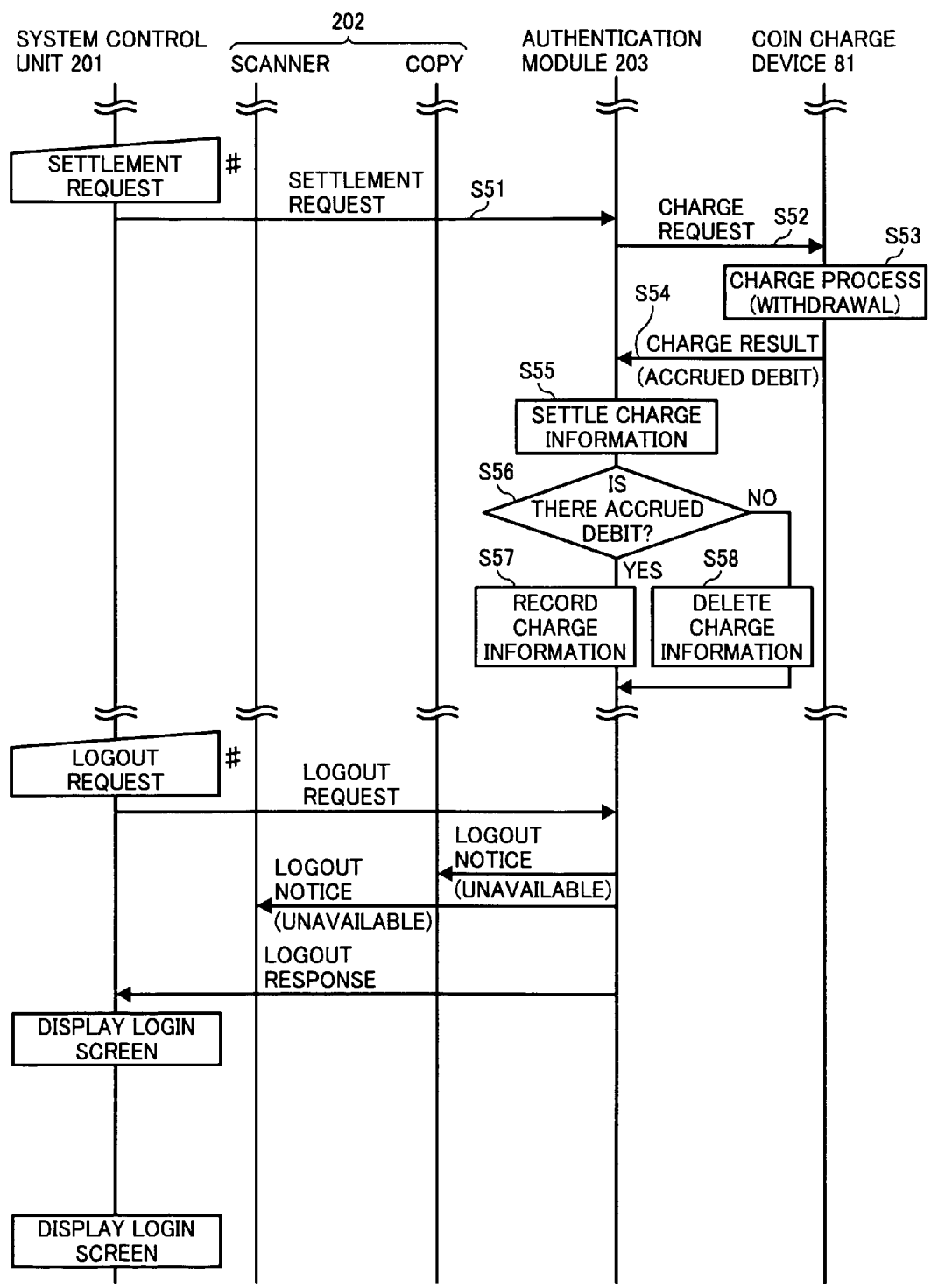
FIG. 14 is a flowchart of a charge-request processing process according to the first embodiment.

FIG. 14 is a flowchart of a charge-request processing process according to the first embodiment. In such a state that a user is logged in the MFP 140, when a charge settlement key 40 (see FIG. 2) of the operating unit 30 is pressed, the system control unit 201 sends a settlement request to the authentication module 203 (step S51). Upon receiving the settlement request, the authentication module 203 sends a charge request indicative of charged amounts obtained by multiplying charge level of the user by a predetermined rate amount (e.g., ten yen per one level) to the payment device 81 based on charge information of the user stored in the HDD 90 (step S52). Upon receiving the charge request, the payment device 81 performs a charge process of withdrawing required amounts of money indicated in the charge request (step S53). When inserted amounts is not sufficient for withdrawal of the required amounts, the payment device 81 notifies accrued debit as a charge result to the authentication module 203 (step S54). If there is no accrued debit, the payment device 81 sends a charge result indicating no accrued debit to the authentication module 203.

Upon receiving the charge result, the authentication module 203 performs settlement of the charge information (step S55), and checks whether there is accrued debit in reference to the charge result (i.e., whether amounts of accrued debit in the charge result is larger than zero) (step S56). When there is accrued debit (Yes at step S56), the authentication module 203 determines amounts of money obtained by dividing the amounts of accrued debit by a predetermined rate as the charge information, and updates the charge information stored in the HDD 90 (step S57). When the amounts of accrued debit are zero, indicating no accrued debit (No at step S56), the authentication module 203 deletes the charge information from the HDD 90 (step S58).

It is possible to send a charge request from the authentication module 203 to the payment device 81 in synchronization with a charge request generated in a job of the application, or when the job of the application is completed. The logout process is the same as that described in connection with FIG. 13C, and therefore, explanation thereof is omitted.

As described above, the MFP 140 exclusively stores user information and charge information in the HDD 90 when use of applications or mode of the applications are permitted based on the use permission information included in user information received from the authentication server 130. On the other hand, the MFP 140 does not stores such information in the HDD 90 when the applications are not permitted based on the use permission information. Therefore, necessary user information for a necessary user can be exclusively stored in the HDD 90, resulting in reducing usage of the HDD 90.

Furthermore, the MFP 140 stores log information of users in the HDD 90 regardless of the contents of the use permission information. Therefore, it is possible to check execution log of the MFP 140 regardless of states whether users are permitted to use applications. As a result, maintenance efficiency can be improved.

Moreover, it is possible to control storage operation for storing charge information in the HDD 90 based on the use permission information when the user completes job execution of application. Therefore, charge information can be recorded exclusively for a user having such charge information. Thus, it is possible to reduce usage of the HDD 90.

Furthermore, the MFP 140 deletes user information from the HDD 90 when it is determined that there is no accrued debit through a charge process. Therefore, it is possible to reduce usage of the HDD 90.

In the first embodiment, the MFP 140 stores user information and charge information in the HDD 90 when a user is permitted to use application and application mode based on the use permission information contained in the user information received from the authentication server 130. On the other hand, the MFP 140 does not stores such information in the HDD 90 when a user does not permitted to use applications and application modes based on the use permission information. Alternately, it is possible to previously register, to the MFP 140, information difficult to be acquired from the external server 130 for each user. In such configuration, it may be required not to delete user information for specified users for a predetermined period or longer without time limitation. According to a second embodiment of the present invention, deletion attribute, such as deletion permission information indicating whether deletion of information is permitted for each user, or deletion prohibition period indicating a period during which deletion of information is prohibited, can be set in the external server 130 and the MFP 140. In such configuration, it is possible to separately manage users in a specific group, e.g., a department where the MFP 140 is installed, from users in a different group, e.g., a department where the MFP 140 is not installed, within limited resources of the MFP 140. Accordingly, flexible operation can be realized.

Figure 15:
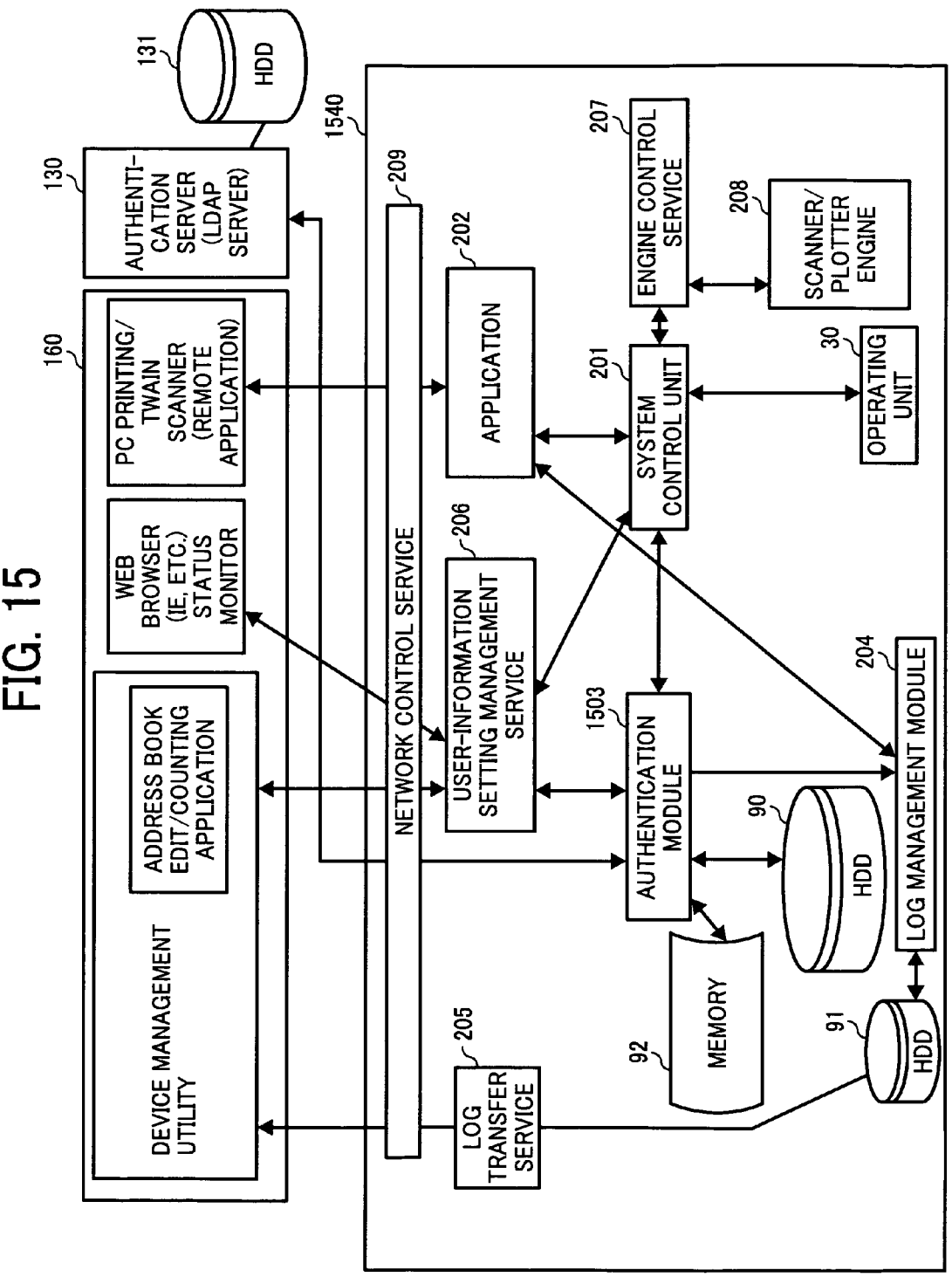
FIG. 15 is a block diagram of a functional configuration of a multifunction product according to a second embodiment of the present invention.

FIG. 15 is a block diagram of a functional configuration of an MFP 1540 according to the second embodiment. The LP 150 has the same functional configuration as that of the MFP 1540, and therefore, explanation thereof is omitted. A network configuration of the second embodiment is the same as that of the first embodiment.

As shown in FIG. 15, the MFP 1540 includes the network control service 209, the application 202, the user-information setting management service 206, the log transfer service 205, the system control unit 201, the engine control service 207, an authenticated-user information management module (hereinafter, "authentication module") 1503, the log management module 204, the operating unit 30, and the scanner/plotter engine 208.

The network control service 209, the application 202, the user-information setting management service 206, the log transfer service 205, the system control unit 201, the engine control service 207, the log management module 204, the operating unit 30, and the scanner/plotter engine 208 are the same as those arranged in the MFP 140.

The authentication module 1503 includes additional functions in addition to the functions described in connection with the authentication module 203. In other words, the authentication module 1503 performs control of storage and deletion of user information and user usage information in/form the HDD 90 based on the deletion attribute, such as deletion permission information and deletion prohibition period, indicative of attribute related to deletion of user information and user usage information, in addition to control of temporary storage and deletion of user information and user usage information in/from the memory 92 and storage of user information and user usage information in the HDD 90 using the authentication server 130.

The deletion permission information indicates whether user information and user usage information, such as log information, can be deleted for each user. The deletion prohibition period indicates a period during which deletion of user information and user usage information for each user is prohibited. According to the second embodiment, the deletion permission information and the deletion prohibition period are recorded in the user information stored in the HDD 131 in association with the user identification information, such as name, user ID, and password.

Furthermore, the deletion permission information and the deletion prohibition period are stored in a nonvolatile memory (not shown) in association with the user identification information. The nonvolatile memory (not shown) stores therein deletion permission information and deletion prohibition period shared by all users. It is previously selected, from a default setting screen, whether shared deletion permission information and deletion prohibition period is used for all users, or deletion permission information and deletion prohibition period unique to each user is used. Selected setting is stored in the nonvolatile memory (not shown). The deletion prohibition period can be determined as appropriate and can be differently set for each user. Accordingly, it is possible to control deletion prohibition period depending on career of each user, or depending on a place where the MFP 1540 is installed.

FIGS. 16A and 16B are tables of examples of contents of user information stored in the HDD 131. As shown in FIGS. 16A and 16B, the deletion permission information and the deletion prohibition period are differently set for each user. The user information is registered to the LDAP server 130 in the following LDIF.

Taro Suzuki
dn: cn=Taro Suzuki, ou=MF, o=RICOH, c=JP
objectClass: person
c: JP
o: RICOH
ou: MF
cn: Taro Suzuki
sn: Suzuki
userid: AA35213
userPassword: NDhIQDQ4RDgsLEBYQ
mail: Taro.S@xxx.ricoh.co.jp
telephoneNumber: +81-33777-XXXX
availableCopyFullColor: TRUE
availableCopy2Color: TRUE
availableCopy1Color: TRUE
availableCopyBlack: TRUE
availableScannerFullColor: FALSE
availableScannerBlack: FALSE
expire_control: TRUE
expire_day: 30
Hanako Yamada
dn: cn=Hanako Yamada, ou=MF, o=RICOH, c=JP
objectClass: person
c: JP
o: RICOH
ou: MF
cn: Hanako Yamada
sn: Yamada
userid: AA58325
userPassword: alkdDK0Ffdk43LJ
mail: Hanako.Y@xxx.ricoh.co.jp
telephoneNumber: +81-8111-XXXX
availableCopyFullColor: FALSE
availableCopy2Color: FALSE
availableCopy1Color: FALSE
availableCopyBlack: TRUE
availableScannerFullColor: FALSE
availableScannerBlack: TRUE
expire_control: FALSE
expire_day: 0

As described above, the MFP 1540 is configured in such a manner that the deletion permission information and the deletion prohibition period are stored in the external server 130 and the nonvolatile memory (not shown) of the MFP 1540. Therefore, it is necessary to store an acquisition source table containing acquisition source from which the deletion permission information and the deletion prohibition period are acquired is previously stored in the nonvolatile memory (not shown). The authentication module 1503 acquires the deletion permission information and the deletion prohibition period from set acquisition source in reference to the acquisition source table.

FIGS. 17A and 17B are examples of contents of the acquisition source table according to the second embodiment. As shown in FIGS. 17A and 17B, user ID as user identification information and acquisition source from which deletion permission information and deletion prohibition period are acquired are registered in the acquisition source table.

Figure 18A:
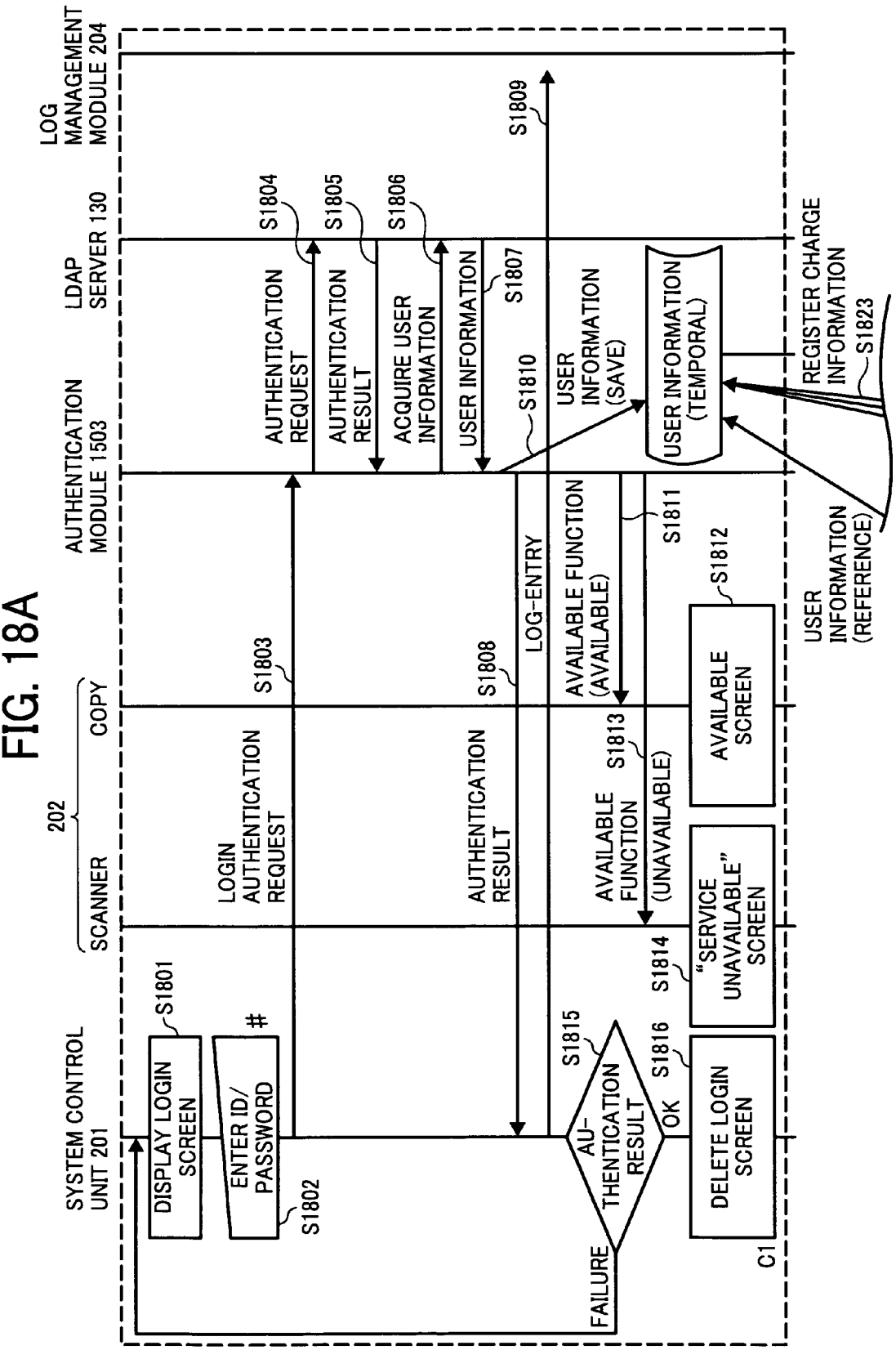
Figure 18B:
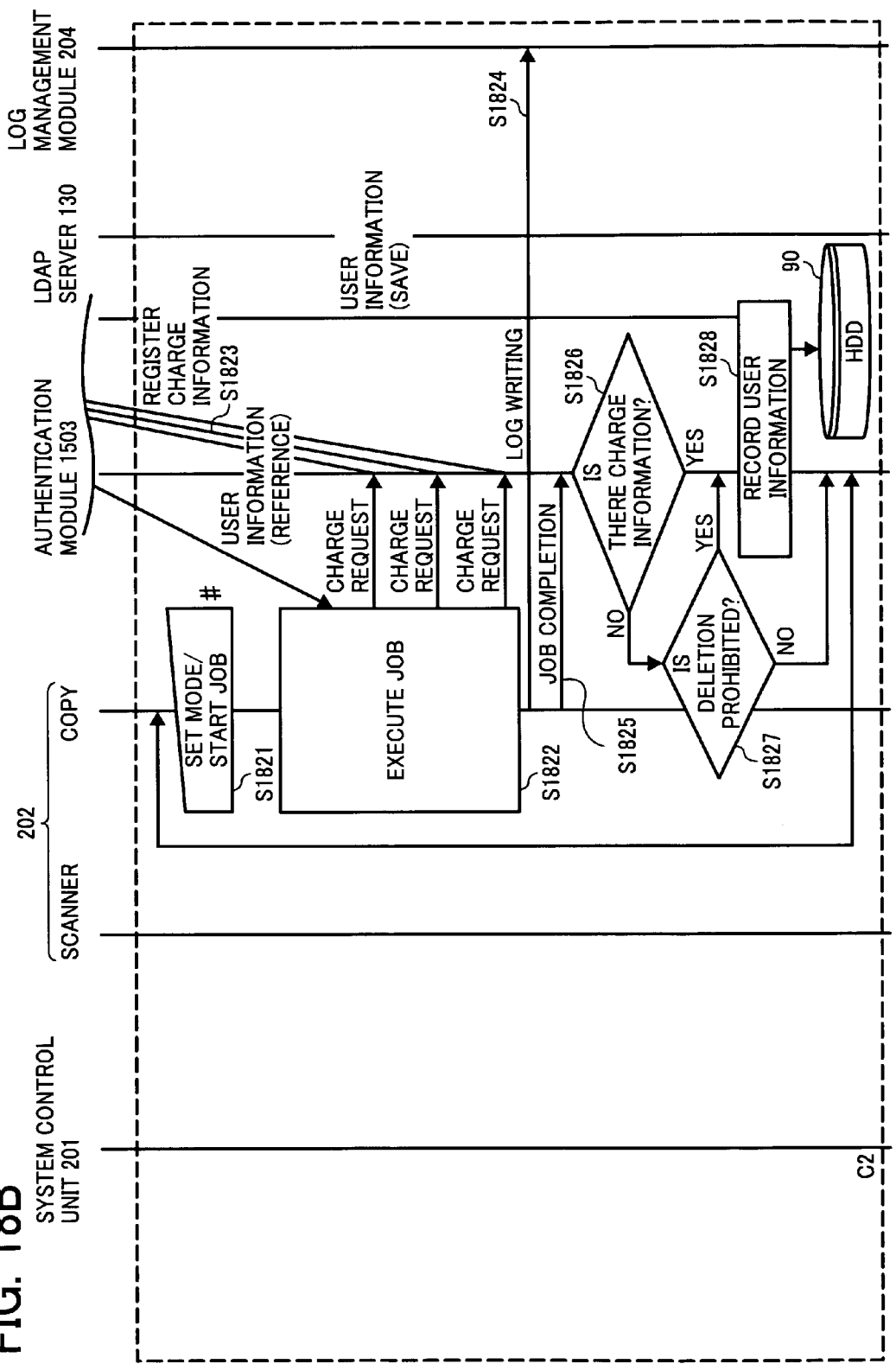

FIGS. 18A to 18C are flowcharts of a user-information management process according to the second embodiment. In below explanation, the user-information management process is separated into a login process shown in block C1 in FIG. 18A, a process of using applications shown in block C2 in FIG. 18B, and a logout process shown in block C3 in FIG. 18C. Processes indicated by "#" are performed by a user.

The login process from steps S1801 to S1816 shown in FIG. 18A is the same as that described in connection with FIG. 13A. In the process of using an application shown in FIG. 18B, processes from step S1821, at which job completion is notified, to step S1826, at which existence of charge information is checked, are the same as those performed from the steps S21 to S26 described in connection with FIG. 13B.

At step S1826, when charge information for a user is stored in the temporary area of the memory 92 (Yes at step S1826), the charge information described in connection with Table 4 is stored in the HDD 90 from the memory 92 (step S1828). On the other hand, when charge information for a user is not stored in the temporary area of the memory 92 (No at step S1826), the authentication module 1503 checks whether information on deletion prohibition is set as user deletion permission information (step S1827). Specifically, the authentication module 1503 determines whether information on deletion prohibition is set by referring to deletion permission information in the user information received from the LDAP server 130. Alternatively, it is possible to determine whether to refer to the deletion permission information in the user information received from an LDAP server 1530 or refer to deletion permission information stored in a nonvolatile memory, by referring to the acquisition source table. Accordingly, it is determined whether deletion prohibition is set in reference to the deletion permission information stored in a determined acquisition source.

When the user deletion permission information does not contain information on deletion prohibition (No at step S1827), the authentication module 1503 does not record the user information received from the LDAP server 130 to the HDD 90. On the other hand, when the user deletion permission information contains information on deletion prohibition (Yes at step S1827), the authentication module 1503 records the user information received from the LDAP server 130 to the HDD 90 (step S1828). When the user executes a plurality of jobs, the processes described in connection with FIG. 18B are repeated.

In the logout process shown in FIG. 18C, processes from steps S1831 to S1833 are the same as those performed from the steps S31 to S33 described in connection with FIG. 13C. When the authentication module 1503 sends a logout notice to an application, and if user information for a user who has logged out is recorded to the HDD 90, the authentication module 1503 deletes password from the user information (step S1834). Accordingly, it is possible to promptly delete part of information that is not preferable to be stored in the MFP 1540 for a long time, from user identification information. Therefore, it is possible to prevent leakage of information.

The authentication module 1503 causes the log management module 204 to store logout time, when the user logs out from the MFP 1540, as log information in the HDD 91 (step S1835). The authentication module 1503 notifies a logout response indicative of completion of logout to the system control unit 201 (step S1836). Upon receiving the logout response, the system control unit 201 displays the login screen on the operating unit 30 (step S1837), so that the MFP 1540 is shifted to a service limited mode.

FIG. 19 is a flowchart of a user-information deletion process based on deletion prohibition period according to the second embodiment.

When a user presses a deletion button on the operating unit 30, the system control unit 201 sends a deletion request to the authentication module 1503 (step S2001). Upon receiving the deletion request, the authentication module 1503 searches the HDD 90 to find charge information of the user who has pressed the deletion button. (step S2002). When charge information of the user is found (Yes at step S2003), the authentication module 1503 checks whether the charge amount in the charge information of the user is zero to determine whether there is accrued debit (step S2004). When it is determined that there is no accrued debit (No at step S2004), the authentication module 1503 refers to the acquisition table in the nonvolatile memory to check whether the acquisition source for acquiring the deletion permission information of the user is the authentication server 130 (step S2005). When it is determined that the acquisition source is the authentication server 130 (Yes at step S2005), the authentication module 1503 acquires deletion attribute of the deletion permission information and the deletion prohibition period from the user information received from the authentication server 130 (step S2006).

On the other hand, when it is determined that the acquisition source is the MFP 1540 (No at step S2005), the authentication module 1503 acquires deletion attribute of the deletion permission information and the deletion prohibition period from the nonvolatile memory (step S2007). In this case, if it is set to use common deletion permission information and common deletion prohibition period for all users, such deletion permission information and deletion prohibition period are acquired. On the other hand, if it is set to use deletion permission information and deletion prohibition period unique to each user, such deletion permission information and deletion prohibition are acquired.

When it is determined that there is accrued debit (Yes at step S2004), process control returns to step S2002. The authentication module 1503 compares the logout time recorded in log information with current time to determine whether difference between two times exceeds a deletion prohibition period (step S2008). When the difference exceeds the deletion prohibition period (Yes at step S2008), the authentication module 1503 deletes user information from the HDD 90 (step S2009). The authentication module 1503 notifies deletion completion notice to the system control unit 201 (step S2010).

When the difference does not exceed the deletion prohibition period (No at step S2008), the authentication module 1503 does not delete user information from the HDD 90, and process control returns to step S2002.

As described above, the MFP 1540 controls storage and deletion of user information and charge information in/from the HDD 90 based on the deletion permission information and the deletion prohibition period contained in the user information or the user usage information. Therefore, it is possible to maintain registration of the user information and the charge information for regular users in a specific department where the MFP 1540 is installed. As a result, it is possible to separately manage users in a department where the MFP 1540 is installed from users in a different department, resulting in realizing flexible operation.

Furthermore, the MFP 1540 controls storage and deletion of user information and charge information in/from the HDD 90 based on the deletion permission information and the deletion prohibition period contained in the user information received from the authentication server 130. Therefore, even when a user uses the MFP 1540 on a network, it is possible to separately manage users in a department where the MFP 1540 is installed from users in a different department, resulting in realizing flexible operation based on common deletion attribute.

Moreover, the MFP 1540 controls storage and deletion of user information and charge information in/from the HDD 90 based on deletion attribute stored in the nonvolatile memory. Therefore, it is possible to change patterns of control of storage and deletion of information depending on the MFP 1540.

Furthermore, when it is set to acquire deletion attribute from an external server, the MFP 1540 controls storage and deletion of user information and charge information in/from the HDD 90 based on the deletion attribute contained in the user information received from the external server. On the other hand, when it is set to acquire deletion attribute from the MFP 1540 itself, the MFP 1540 controls storage and deletion of user information and charge information in/from the HDD 90 based on the deletion attribute contained in the user information received from a nonvolatile memory in the MFP 1540. Therefore, it is possible to select whether to user the deletion attribute in the authentication server or in the MFP 1540. As a result, the MFP 1540 can be effectively managed.

Moreover, the MFP 1540 causes the authentication module 1503 to delete user information and user usage information from the HDD 90 when a deletion prohibition period is exceeded. Therefore, it is possible to resolve overflow of user information and user usage information stored in the HDD 90. As a result, it is possible to control a balance of maintenance of regular users.

According to an aspect of the present invention, storage of user information and user usage information in a storing unit is controlled based on use permission information contained in user information received from an external server. Therefore, it is possible to control storage of necessary user information in the storing unit. As a result, memory usage of the storing unit can be reduced.

Furthermore, according to another aspect of the present invention, a log management unit is controlled to store log information of a user as user usage information regardless of contents of the use permission information. Therefore, it is possible to improve maintenance by checking execution contents of an information processing apparatus even for a user who is not permitted to use some functions.

Moreover, according to still another aspect of the present invention, storage of charge information in the storing unit is controlled based on the use permission information when user completes execution of functions. Therefore, it is possible to record charge information exclusively for a user who has charge information. Thus, memory usage of the storing unit can be reduced.

Furthermore, according to still another aspect of the present invention, control unit controls storage and deletion of user information and user usage information in/from the storing unit based on deletion attribute indicative of deletion of user information and user usage information contained in user information received from an external server. Therefore, it is possible to maintain registration of user information and user usage information for regular users, who are in a department where the information processing apparatus is installed, and to separately manage the users from other users who are in different departments. As a result, it is possible to realize flexible operation.

Moreover, according to still another aspect of the present invention, the control unit controls storage and deletion of user information and user usage information in/from the storing unit based on deletion attribute contained in user information received from an external server. Therefore, even when a user uses any information processing apparatuses on a network, it is possible to separately manage the users from other users, who are not in the same department, based on common deletion attribute.

Furthermore, according to still another aspect of the present invention, the control unit controls storage and deletion of user information and user usage information in/from the storing unit based on deletion attribute stored in a second storing unit. Therefore, it is possible to change patterns of control of storage and deletion depending on information processing apparatuses.

Moreover, according to still another aspect of the present invention, when it is set to acquire deletion attribute from an external server, the control unit controls storage and deletion of user information and charge information in/from the storing unit based on the deletion attribute contained in the user information received from the external server. On the other hand, when it is set to acquire deletion attribute from the information processing apparatus, the control unit controls such storage and deletion based on the deletion attribute contained in the user information received from the second storing unit. Therefore, it is possible to select whether to use the deletion attribute in the external server or in the information processing apparatus. As a result, it is possible to realize effective management of the information processing apparatus.

Furthermore, according to still another aspect of the present invention, deletion prohibition period can be determined as appropriate and can be differently set for each user. Accordingly, it is possible to control deletion period depending on career of each user, or depending on a place where the information processing apparatus is installed.

Moreover, according to still another aspect of the present invention, the control unit deletes user information and user usage information from the storing unit when a deletion prohibition period is exceeded. Therefore, it is possible to resolve overflow of user information and user usage information stored in the storing unit. As a result, it is possible to control a balance of maintenance of regular users.

Furthermore, according to still another aspect of the present invention, the control unit deletes authentication information contained in user identification information of user information stored in the storing unit when a user logs out of the information processing apparatus. Therefore, it is possible to promptly delete part of information that is not preferable to be stored in the information processing apparatus for a long time, from user identification information. As a result, leakage of information can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus connected to an external server via a network,
the external server to store therein user information including user identification information unique to a user in association with use permission information indicative of permission for using functions of the information processing apparatus,
the information processing apparatus comprising:
a first storing unit to store therein information including the user information and user usage information, the user usage information including at least a part of the user identification information in association with usage information indicative of usage of the information processing apparatus by the user, the usage information including first charge information for each of the functions of the information processing apparatus executed by the user;
a second storing unit;
a transmitting unit to transmit user authentication information of the user to the external server upon receiving the user authentication information from the user;
a receiving unit to receive the user information of the user from the external server, and to receive a charge result of a charge process received from a charge device connected to the network, the charge result based on the first charge information; and
a control unit to control an operation of storing
to store the user usage information and at least a first part of the user information in the first storing unit based on the use permission information, included in the user information received by the receiving unit such that when a second part of the user information is usable by one of the functions for which the use permission information indicates prohibition and the second part of the user information is not usable by any of the functions for which the use permission information of the received user information indicates permission, the second part of the user information is not stored in the first storing unit,
to update the first charge information stored in the first storing unit when the charge result indicates existence of accrued debit, and delete the first charge information from the first storing unit when the charge result indicates that there is no accrued debit, and
to check, when a job is completed by the information processing apparatus, whether the second storing unit includes second charge information, and to update the first charge information in the first storing unit if the second storing unit includes the second charge information, and not update the first charge information in the first storing unit if the second storing unit does not include the second charge information.

2. The information processing apparatus according to claim 1, further comprising:
a log managing unit to store in the first storing unit log information indicative of execution of the functions,
wherein the control unit is configured to control the log managing unit to store the log information as user usage information in the first storing unit regardless of contents of the use permission information.

3. The information processing apparatus according to claim 1, wherein the control unit does not store in the first storing unit the first charge information for a function of the information processing apparatus which is not permitted for a user based on the use permission information.

4. The information processing apparatus according to claim 1, wherein the control unit is configured to control storage and deletion of the at least the first part of the user information and the user usage information in and from the first storing unit based on a deletion attribute of the user information and the user usage information.

5. The information processing apparatus according to claim 4, wherein
the user information contains the deletion attribute in association with the user identification information, and
the control unit is configured to control storage and deletion of the at least the first part of the user information and the user usage information in and from the first storing unit based on the deletion attribute corresponding to the user identification information of the user information.

6. The information processing apparatus according to claim 5, wherein
the external server is configured to store therein the user information containing the deletion attribute in association with the user identification information, and
the control unit is configured to control storage and deletion of the at least the first part of the user information and the user usage information in and from the first storing unit based on the deletion attribute contained in the user information received from the external server.

7. The information processing apparatus according to claim 5, further comprising:
a third storing unit to store therein the deletion attribute for each user,
wherein the control unit is configured to control storage and deletion of the at least the first part of the user information and the user usage information in and from the first storing unit based on the deletion attribute stored in the third storing unit.

8. The information processing apparatus according to claim 5, further comprising:
a third storing unit to store therein the deletion attribute for each user; and
a fourth storing unit to store therein acquisition source that indicates whether the deletion attribute is acquired from the external server or the information processing apparatus for each user,
wherein the external server is configured to store therein the user information containing the deletion attribute in association with the user identification information, and
the control unit is configured to control storage and deletion of the at least the first part of the user information and the user usage information in and from the first storing unit based on the deletion attribute received from the external server when the acquisition source indicates the external server, and based on the deletion attribute received from the third storing unit when the acquisition source indicates the information processing apparatus.

9. The information processing apparatus according to claim 4, wherein
the deletion attribute contains deletion permission information indicating whether the user information and the user usage information can be deleted for each user, and the control unit is configured to store the at least the first part of the user information and the user usage information in the first storing unit when the user completes execution of functions of the information processing apparatus, and the deletion permission information indicates prohibition of deletion of the user information and the user usage information.

10. The information processing apparatus according to claim 5, wherein
the deletion attribute contains deletion prohibition period indicative of period for maintaining the at least the first part of the user information and the user usage information, and
the control unit is configured to delete the at least the first part of the user information and the user usage information in the first storing unit when the deletion prohibition period is exceeded.

11. The information processing apparatus according to claim 10, wherein the deletion prohibition period is differently set for at least a plurality of users.

12. The information processing apparatus according to claim 4, wherein the control unit deletes the authentication information contained in the user identification information of the user information stored in the first storing unit when the user logs out of the information processing apparatus.

13. A method of managing user information, the method being implemented on a processing apparatus connected to an external server via a network, the external server storing therein user information including user identification information unique to a user in association with use permission information indicative of permission for using functions of the information processing apparatus, the method comprising:
transmitting user authentication information of a user to the external server upon receiving the user authentication information from the user;
receiving user information of the user from the external server and a charge result of a charge process received from a charge device connected to the network, the charge result based on first charge information; and
controlling an operation of storing including
storing user usage information and at least a first part of the user information in a first storing unit based on the use permission information included in the user information received from the external server, the user usage information including at least a part of the user identification information in association with usage information indicative of usage of the information processing apparatus by the user, the usage information including the first charge information for each of the functions of the information processing apparatus executed by the user,
storing a second part of the user information in the first storing unit when the second part of the user information is usable by one of the functions for which the use permission information indicates permission, and not storing the second part of the user information in the first storing unit when the second part of the user information is usable by one of the functions for which the use permission information indicates prohibition and the second part of the user information is not usable by any of the functions for which the use permission information of the received user information indicates permission,
updating the first charge information stored in the first storing unit when the charge result indicates existence of accrued debit, and deleting the first charge information from the first storing unit when the charge result indicates that there is no accrued debit, and checking, when a job is completed by the information processing apparatus, a second storing unit to determine whether the second storing unit includes second charge information, and updating the first charge information in the first storing unit if the second storing unit includes the second charge information, and not updating the first charge information in the first storing unit if the second storing unit does not include the second charge information.

14. A computer program product that includes a non-transitory computer-readable recording medium that stores therein a computer program that causes a computer to implement a method of managing user information on a processing apparatus connected to an external server via a network, the external server storing therein user information including user identification information unique to a user in association with use permission information indicative of permission for using functions of the information processing apparatus, and the computer program causes a computer to execute:

transmitting user authentication information of a user to the external server upon receiving the user authentication information from the user;

receiving user information of the user from the external server and a charge result of a charge process received from a charge device connected to the network, the charge result based on first charge information; and controlling an operation of storing including storing user usage information and at least a first part of the user information in a first storing unit based on the use permission information included in the user information received from the external server, the user usage information including at least a part of the user identification information in association with usage information indicative of usage of the information processing apparatus by the user, the usage information including the first charge information for each of the functions of the information processing apparatus executed by the user, storing a second part of the user information in the first storing unit when the second part of the user information is usable by one of the functions for which the use permission information indicates permission, and not storing the second part of the user information in the first storing unit when the second part of the user information is usable by one of the functions for which the use permission information indicates prohibition and the second part of the user information is not usable by any of the functions for which the use permission information of the received user information indicates permission, updating the first charge information stored in the first storing unit when the charge result indicates existence of accrued debit, and deleting the first charge information from the first storing unit when the charge result indicates that there is no accrued debit, and checking, when a job is completed by the information processing apparatus, a second storing unit to determine whether the second storing unit includes second charge information, and updating the first charge information in the first storing unit if the second storing unit includes the second charge information, and not updating the first charge information in the first storing unit if the second storing unit does not include the second charge information.

\* \* \* \* \*